(12) United States Patent
Campisi-Pinto et al.

(10) Patent No.: US 11,109,523 B2
(45) Date of Patent: Sep. 7, 2021

(54) PRECISION CROP PRODUCTION-FUNCTION MODELS

(71) Applicant: THE REGENTS OF THE UNIVERSITY OF CALIFORNIA, Oakland, CA (US)

(72) Inventors: Salvatore Campisi-Pinto, Riverside, CA (US); David Crowley, Riverside, CA (US); Carol J. Lovatt, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 1053 days.

(21) Appl. No.: 15/682,209

(22) Filed: Aug. 21, 2017

(65) Prior Publication Data

US 2018/0049364 A1    Feb. 22, 2018

Related U.S. Application Data

(60) Provisional application No. 62/377,133, filed on Aug. 19, 2016.

(51) Int. Cl.
*A01B 79/00* (2006.01)
*A01C 21/00* (2006.01)
*G06F 17/40* (2006.01)

(52) U.S. Cl.
CPC .......... *A01B 79/005* (2013.01); *A01C 21/007* (2013.01); *G06F 17/40* (2013.01); *A01C 21/00* (2013.01)

(58) Field of Classification Search
CPC ...... A01B 79/005; A01C 21/007; G06F 17/40
USPC ........................................................ 702/19
See application file for complete search history.

(56) References Cited

U.S. PATENT DOCUMENTS

| | | |
|---|---|---|
| 7,440,901 B1 | 10/2008 | Dlott et al. |
| 8,055,472 B2 | 11/2011 | Fluegge et al. |
| 8,340,828 B2 | 12/2012 | Danieli |
| 8,489,437 B1 | 7/2013 | Dlott et al. |
| 9,165,271 B2 | 10/2015 | Dlott et al. |
| 9,412,081 B2 | 8/2016 | Dlott et al. |
| 9,436,920 B2 | 9/2016 | Dlott et al. |
| 9,582,778 B2 | 2/2017 | Dlott et al. |
| 9,607,276 B2 | 3/2017 | Dlott et al. |
| 9,619,760 B2 | 4/2017 | Dlott et al. |
| 9,619,761 B2 | 4/2017 | Dlott et al. |
| 9,619,762 B2 | 4/2017 | Dlott et al. |
| 9,619,763 B2 | 4/2017 | Dlott et al. |
| 9,619,764 B2 | 4/2017 | Dlott et al. |
| 9,626,636 B2 | 4/2017 | Dlott et al. |
| 2003/0018431 A1 | 1/2003 | Hanson |
| 2006/0282228 A1 | 12/2006 | Avey et al. |
| 2007/0220808 A1 | 9/2007 | Kaprielian et al. |
| 2014/0165713 A1 | 6/2014 | Frey |
| 2014/0188543 A1 | 7/2014 | Pearlmutter et al. |
| 2014/0189903 A1 | 7/2014 | Duncan et al. |
| 2014/0321714 A1 | 10/2014 | Masten |
| 2015/0242970 A1 | 8/2015 | Avey et al. |
| 2015/0278966 A1 | 10/2015 | Johnson |

FOREIGN PATENT DOCUMENTS

CA    2663917 A1    10/2010

OTHER PUBLICATIONS

The International Search Report and Written Opinion from Application No. PCT/US2017/047835, dated Oct. 27, 2017.
Koenker et al., "Regression Quantiles", *Econometrica*, p. 33-50, vol. 46, No. 1 (Jan. 1978).
Bustan et al., "Preharvest Circumstances Leading to Elevated Oil Acidity in 'Barnea' Olives", *Elsevier—Scientia Horticulturae* 176, p. 11-21(Sep. 2014).
Crowley et al., "Decision Support Tools for Avocado Fertilization & Salinity Management: Preview to the Final Project Report", *From the Grove—California AvoTech.*, p. 25-28 (Fall 2015).
Crowley, D. et al.; "Decision Support Tools for Optimizing Water Use Efficiency, Fruit Quality, and Profitability in Avocado Production"; Presented at California Avocado Commission Board Meeting; Mar. 17, 2016; 42 pages.
California Avocado Commission, Abstract: "Decision Support Tools for Management of Avocado Nutrition and Chloride Toxicity—Final Report," 2017, available at https://www.californiaavocadogrowers.com/research-library/decision-support-tools-management-avocado-nutrition-and-chloride-toxicity-final, last accessed Oct. 5, 2018.
Crowley, D., et al., "Final Report: Decision Support Tools for Management of Avocado Nutrition and Chloride Toxicity," Oct. 28, 2016, 32 pages, available at https://www.californiaavocadogrowers.com/sites/default/files/DST-Final-Report-Crowley-2016_1.pdf (published online Jan. 9, 2017).
Crowley, D., et al., "Presentation for Seminar 17: Decision Support Tools for Fertilization of Avocado," May 1-3, 2017, available at http://indexfresh.com/wp-content/uploads/2017/03/Crowley-Index-Decision-Support-Tools-V2.pdf, last accessed Oct. 8, 2018, 46 pages.

(Continued)

*Primary Examiner* — Jerry Lin
(74) *Attorney, Agent, or Firm* — Kilpatrick Townsend & Stockton LLP

(57) ABSTRACT

Systems, apparatuses, and methods as described herein relate to analyzing plant nutrient-yield relationships and identifying optimum plant fertilization strategies to improve individual plant yields and overall plant yields. Nutrient data and yield data for plants in all yield ranges, rather than nutrient data and yield data for only the best-performing plants, is categorized based on the yield data and then analyzed to determine the yield as a function of nutrient condition for each nutrient element for the plants in each yield category. The nutrient-yield function can be modeled using a polynomial equation of various orders that can be used for determining the nutritional condition to improve crop production for plants in each yield category.

19 Claims, 28 Drawing Sheets

(56) References Cited

OTHER PUBLICATIONS

Crowley, D., et al., "Seminar 17: Decision Support Tools for Fertilization of Avocado," May 1-3, 2017, available online Jul. 10, 2017 at https://vimeo.com/225009207, last accessed on Oct. 8, 2018.

Crowley, D. et al., "Decision Support Tools for Avocado Fertilization & Salinity Management: Preview to the Final Project Report," 5(3) From the Grove 25, Fall 2015 (published Sep. 16, 2015), pp. 25-28.

McKenzie, R., "Crop Nutrition and Fertilizer Requirements," Agdex 540-1, pp. 1-7, Jan. 1, 1998.

Nutri-Facts, Agronomic Fact Sheets on Crop Nutrients, North American Edition, Issues No. 1-No. 17, available at http://www.ipni.net/nutrifacts, created Jun. 3, 2014, last accessed Oct. 5, 2018.

Uchida, R., "Chapter 3: Essential Nutrients for Plant Growth: Nutrient Functions and Deficiency Symptoms," Plant Nutrient Management in Hawaii's Soils, Approaches for Tropical and Subtropical Agriculture (Silva, J. et al. eds. 2000), College of Tropical Agriculture and Human Resources, University of Hawaii at Manoa, pp. 31-55, 2000, available at http://src.gov.jm/wp-content/uploads/2013/02/pnm3.pdf. last accessed Oct. 5, 2018.

University of Wisconsin, "Essential Elements for Plant Growth—Macronutrients and Micronutrients," htip://soils.wisc.edu/facstaff/barak/soilscience326/macronut.htm, last accessed Oct. 5, 2018.

Nutrient Stewardship, "Plant Tissue Analysis Tells the Story," http://www.nutrientstewardship.com/implementation/plant-tissue-analyss-tells-the-story/, published 2017, accessed Oct. 5, 2018.

University of California, Advanced Sensing and Management Technologies to Optimize Resource Use in Deciduous Tree Crops, http://ucanr.edu/sites/scri/, updated May 1, 2014, last accessed Oct. 5, 2018.

University of California, Agriculture and Natural Resources, Fruit & Nut Crops, Avocadoes, https://anrcatalog.ucanr.edu/Items.aspx?hierId=160050, last accessed Oct. 5, 2018.

University of Nebraska, Plant and Soil Sciences eLibrary, Soils—Part 9: Fundamentals of Soil Testing, http://passel.unl.edu/pages/informationmodule.php?idinformationmodule=1130447046&topicorder=10 last accessed Oct. 5, 2018.

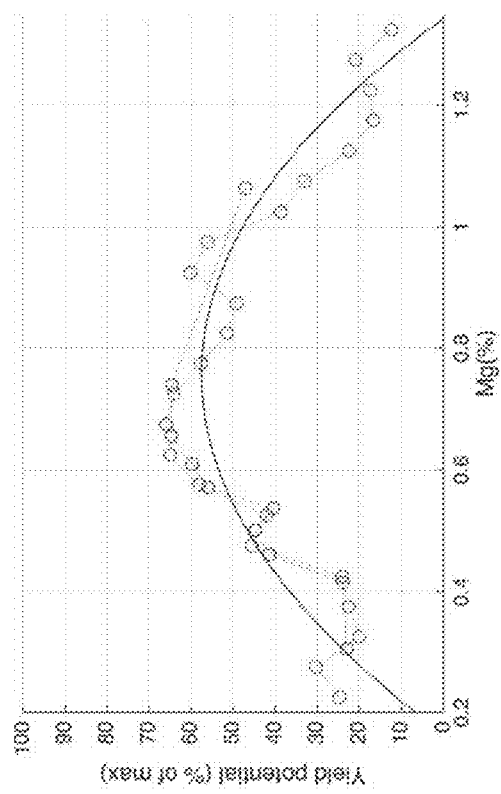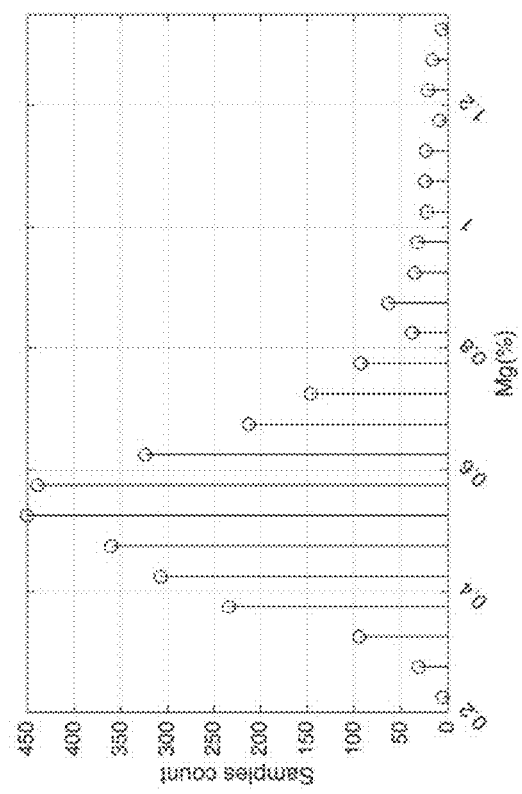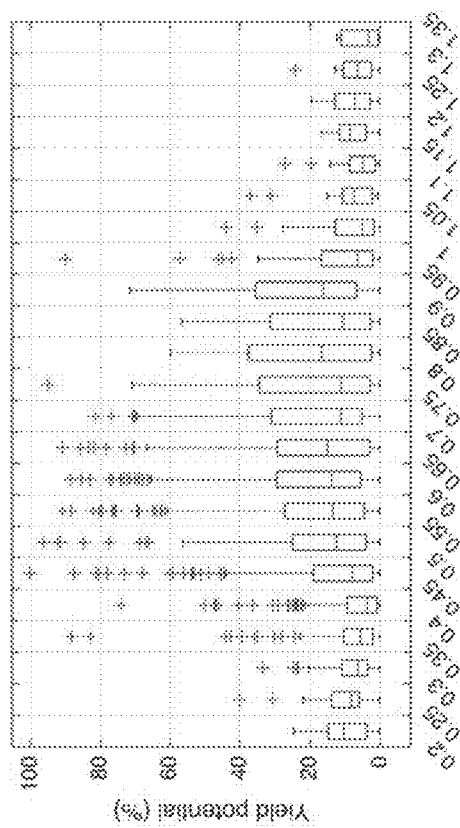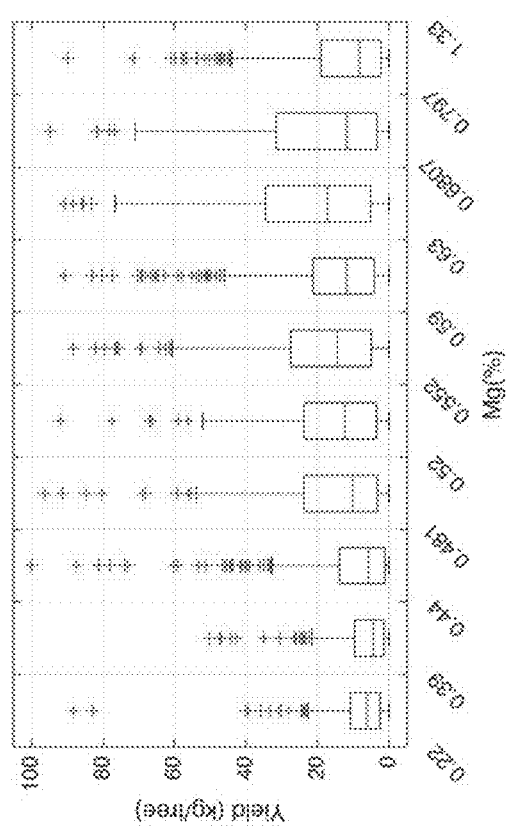
FIG. 15A
FIG. 15B
FIG. 15C
FIG. 15D

N (%)
Linear model Poly3:
$$Y = p_1 x^3 + p_2 x^2 + p_3 x + p_4$$
Coefficients (with 95% confidence bounds):
  p1 =   -68.55  (-153.5, 16.45)
  p2 =     508   (-143.9, 1160)
  p3 =   -1270   (-2885, 344.5)
  p4 =    1255   (-31.86, 2542)

Goodness of fit:
SSE: 2.549e+04
R-square: 0.6306
Adjusted R-square: 0.5691
RMSE: 37.63

P (%)
Linear model Poly4:
$$f(x) = p1 \cdot x^4 + p2 \cdot x^3 + p3 \cdot x^2 + p4 \cdot x + p5$$
Coefficients (with 95% confidence bounds):
  p1 = -1.494e+06  (-2.067e+06, -9.208e+05)
  p2 =  1.178e+06  (7.407e+05, 1.615e+06)
  p3 = -3.27e+05   (-4.443e+05, -2.097e+05)
  p4 =  3.636e+04  (2.342e+04, 4.93e+04)
  p5 =    -1106    (-1593, -619.5)

Goodness of fit:
SSE: 2.786e+04
R-square: 0.8566
Adjusted R-square: 0.8306
RMSE: 35.58

K (%)
Linear model Poly4:
$$f(x) = p1 \cdot x^4 + p2 \cdot x^3 + p3 \cdot x^2 + p4 \cdot x + p5$$
Coefficients (with 95% confidence bounds):
  p1 = -1.494e+06  (-2.067e+06, -9.208e+05)
  p2 =  1.178e+06  (7.407e+05, 1.615e+06)
  p3 = -3.27e+05   (-4.443e+05, -2.097e+05)
  p4 =  3.636e+04  (2.342e+04, 4.93e+04)
  p5 =    -1106    (-1593, -619.5)

Goodness of fit:
SSE: 2.786e+04
R-square: 0.8566
Adjusted R-square: 0.8306
RMSE: 35.58

Cl (%)
Linear model Poly2:
$$f(x) = p1 \cdot x^2 + p2 \cdot x + p3$$
Coefficients (with 95% confidence bounds):
  p1 =  -98.93  (-174.9, -23)
  p2 =   43.96  (-65.76, 153.7)
  p3 =   130.2  (97.04, 163.4)

Goodness of fit:
SSE: 3812
R-square: 0.8588
Adjusted R-square: 0.8331
RMSE: 18.62

FIG. 17

PRECISION CROP PRODUCTION-FUNCTION MODELS

CROSS-REFERENCES TO RELATED APPLICATIONS

This application claims priority to U.S. Provisional Application No. 62/377,133, filed on Aug. 19, 2016, the entire content of which is incorporated by reference herein.

BACKGROUND

With increasing costs of water, fertilizers, labor and lands, it is desirable to increase crop production per unit area or per plant to increase profits. Optimizing crop nutritional condition may be a cost-effective way to increase crop production. Tools are needed to design fertilization strategies to improve yields for both high-yielding areas or plants and low-yielding areas or plants to improve the overall crop production.

BRIEF SUMMARY

Disclosed herein are techniques for analyzing plant nutrient-yield relationships and identifying optimum plant fertilization strategies to improve individual plant yields and overall plant yields. Quantile regression (QR) or artificial neural network (ANN) modeling methods may be used to generate statistically tight predictions of potential plant yields in relation to plant nutrient condition for plants having inherently different potential yields due to environmental constraints other than the nutritional condition. More specifically, sample plant nutrient-yield data for plants in all yield ranges, rather than only the best-performing plants, is categorized based on yield data and then analyzed to determine the yield as a function of nutrient condition for each nutrient element for the plants in each yield category. The nutrient-yield function can be modeled using a polynomial equation of various orders, which may then be used for determining the nutritional condition for maximum crop production.

Methods disclosed herein allow simultaneous optimization of all nutrient elements for plants having different potential yields based on the determined predictive nutrient-yield function, and can provide recommendations on fertilization strategies to plant growers for improved yields. The disclosed methods can also reduce fertilizer costs and improve environmental safety by, for example, reducing unnecessary fertilization and minimizing groundwater contamination from the unnecessary fertilization.

BRIEF DESCRIPTION OF THE DRAWINGS

The detailed description is set forth with reference to the accompanying figures.

FIG. 15A illustrates yield potentials for trees with different leaf magnesium concentration levels, where trees are binned based on their leaf magnesium concentration levels at a step of about by 0.05% per bin.

FIG. 15B illustrates yield potentials with respect to leaf magnesium concentration levels for trees in the top 5% production category.

FIG. 15C illustrates yield potentials for trees having leaf magnesium concentration level within different ranges, where the number of trees in each leaf magnesium concentration range is about 10% of the total number of tree in the data set.

FIG. 15D illustrates the number of trees in each equally divided leaf magnesium concentration range.

FIG. 17 illustrates example polynomial equations that provide the best fits for data from the top 5% best performing trees for various nutrient elements.

DETAILED DESCRIPTION

Figure 1:
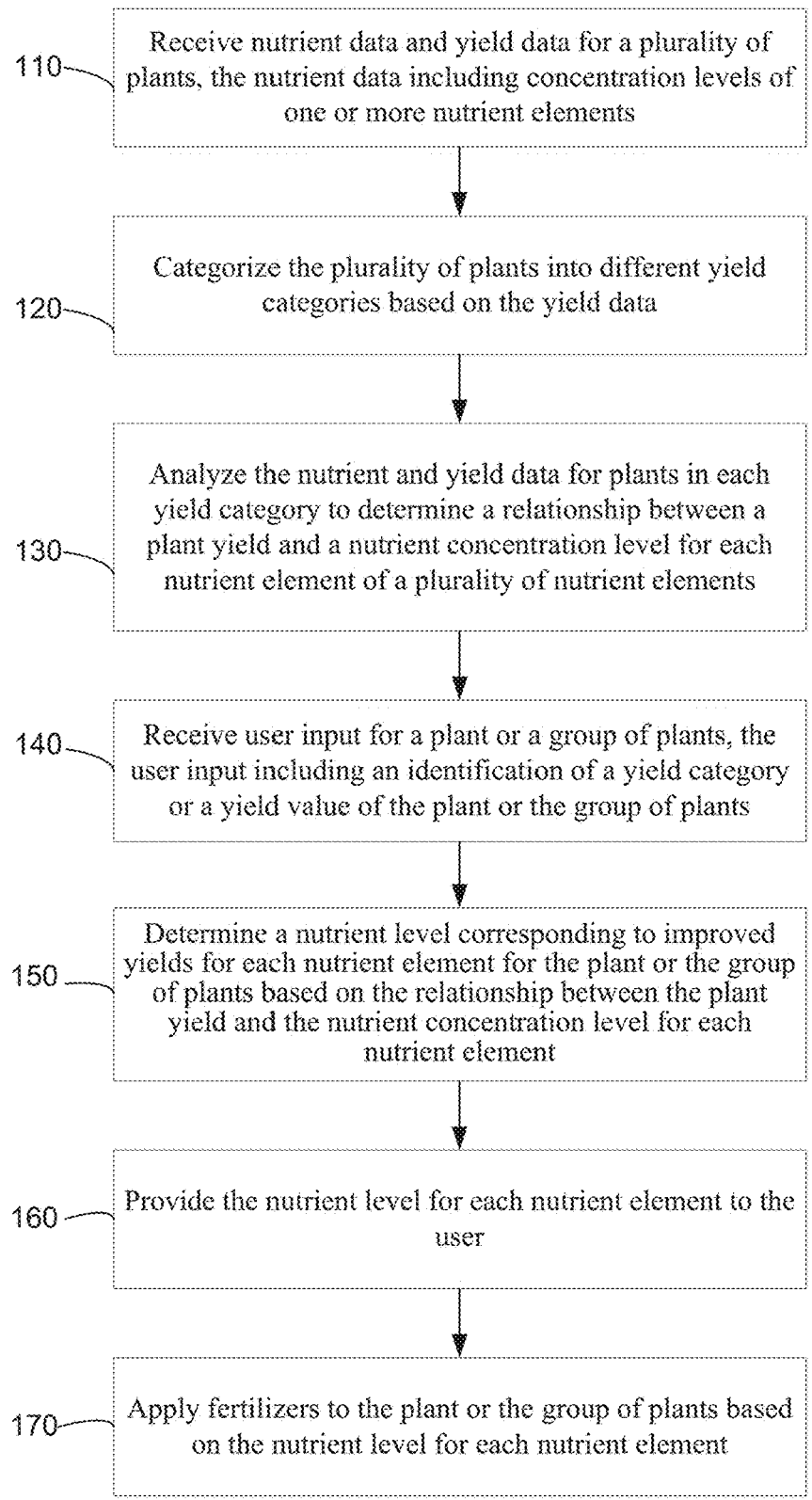
FIG. 1 is a simplified flow chart illustrating an example method for determining appropriate nutrient concentration levels for a plant or a group of plants, according to some aspects of the present disclosure.

Disclosed herein are techniques for analyzing plant nutrient-yield relationships and identifying the optimum plant fertilization strategy to improve individual plant yields and the overall plant yield. More specifically, nutrient and yield data from plants in all yield ranges, rather than only the best-performing plants, is collected and categorized based on yield data. Nutrient-yield data for plants in each yield category is then analyzed to determine the yield as a function of nutritional condition for each nutrient element for the plants in each yield category, where quantile regression (QR) or artificial neural network (ANN) modeling techniques may be used to generate statistically tight predictions of plant yield potentials in relation to plant nutrient conditions for plants having inherently different potential yields due to environmental constraints other than the nutritional condition. The yield function for each nutrient element may be modeled using a polynomial equation of various orders, which may be used for determining the optimum nutritional condition for a specific plant or a specific group of plants (e.g., plants in a specific area) for maximum crop production.

As used herein, the term "optimal" or "optimum" condition refers to a condition that may improve the plant yield to a level close to a maximum achievable yield, such as, for example, less than about 5% lower than the maximum achievable yield, less than about 10%. lower than the maximum achievable yield, or less than about 20% lower than the maximum achievable yield.

With the increasing costs of water, fertilizers, labor, and lands, it is desirable to increase crop production per unit area or per plant to increase profits. Optimizing crop nutritional condition is a cost-effective way to increase crop production and/or reduce fertilizer cost and improve environmental safety by, for example, reducing unnecessary fertilization and minimizing groundwater contamination from the unnecessary fertilization.

In the examples described below, methods for improving avocado production are described in detail. A skilled person would understand that the methods are being provided for illustration purposes only, and are not intended to be limiting. For example, the methods described herein may be used to improve productions in other types of crops, such as, for example, pistachios, almonds, citrus, pecans, walnuts, apples, cherries, and peaches.

Furthermore, in the examples described below, nutrient concentration levels may be determined through leaf analysis. A skilled person would understand that other methods of determining nutrient concentration levels or other plant tissues may be used. For example, inflorescence tissue analysis using cauliflower state or full bloom stage plant tissue may be used.

The global avocado (*Peresea americana*) industry is dominated by the Hass cultivar despite the associated production problems of low fruit set, small fruit size, and alternate bearing. The California Hass avocado industry suffers from low yields, with an average yield for the last 20 years of only 6,489 kg per hectare (hereinafter "ha," i.e., $10^4$ square-meters). With the increasing costs of producing avocados (e.g., water, fertilizer, labor, land, etc.), avocado growers need to increase yield per ha in order to make economic sense for growing avocados.

Optimizing crop nutritional condition is a cost-effective way to increase crop yield. Nutrient analysis of plant tissues is a popular tool for assessing the nutrient condition of horticultural crops in order to design fertilization strategies to achieve high yields. Growers in many avocado-producing areas generally rely on nutrient analysis of 6-month-old leaves from non-bearing terminals for fertilization management. For example, leaf samples may be taken for analysis in September or October of the first year, the avocado fruit may be harvested in March or April of the second year, and leaf samples may be taken again in September or October of the second year. When completed early in a growing season, results of plant tissue analysis can reveal nutritional problems in time for the growers to take corrective actions before the fruit yield, size, and quality are negatively affected. Tissue analysis may also complement soil analysis to determine the amounts of nutrients in the soil that were actually absorbed by the root system and transported to the canopy. When used with soil analysis, tissue analysis can assist in identifying not only soil nutrient deficiencies and excesses, but also unfavorable soil characteristics (e.g., pH, cation exchange, salinity) that may compromise absorption of nutrients by the root, or can assist in determining other potential factors that may limit the nutrient absorption by the roots (e.g., low or high temperature, insufficient or excessive water, root damage caused by disease, insect and nematode pests, or mechanical injury).

Based on the nutrient data of plant tissues and the corresponding yield data, a relationship between the yield and the nutrient concentration levels of various nutrient elements may be determined using various techniques, such as regression analysis, neural network, or other machine learning techniques. The determined relationship may then be used to predict yield based on nutrient concentration levels, or to guide the growers to optimize nutrient concentration levels to improve yields.

Regression analysis techniques may be used to estimate a rate of change of a response variable as a function of predictor variable(s). Most regression analysis techniques focus on the rate of change in a specific percentile range in the response variable distribution, for example, 50 percentile (i.e., the mean) or 90 percentile of the response variable distribution, as a function of the predictor variable(s). This method may be problematic for regression models with heterogeneous variances, which are common in crop production, because there may not be a single rate of change that can characterize the rate of change in different categories (e.g., different percentiles) of the response variable distribution. In other words, more than one single rate of change (i.e., slope) may be needed to more precisely describe the relationship between the response variable and predictor variable(s) in different categories.

For example, crop production function may be modeled using envelope analysis, which quantifies plant nutrient-yield responses for the best performing plants in a population, such as the top 5% of plants that may be in a favorable location and that may have no other environmental stress constraints that limit their potential yields. However, models generated using envelope analysis may not be applicable to lower performing plants in the population. Thus, a fertilization strategy based on the model may improve yields for the best performing plants, but may not improve yields for the lower performing plants. As such, the overall yields of the plants in the population may not be improved. Techniques disclosed herein may improve the yield of individual plant and the overall yield of an orchard.

I. Example Method

FIG. 1 is a simplified flow chart illustrating an example method for determining appropriate nutrient concentration levels for a plant or a group of plants, according to some aspects of the present disclosure. The method may be implement on a computer system or may be provided as a user application or web application on a server.

At block 110, nutrient and yield data for a plurality of plants may be collected and provided to a computing system as a training data set. The nutrient and yield data may include data for the plurality of plants over a number of years. The nutrient and yield data may also include data for plants in different growing areas. In some embodiments, the nutrient and yield data may include average data or typical data for plants in a group or an area that have similar nutrient and yield data.

At block 120, the plurality of plants may be categorized into different yield categories based on their yield data. For example, the plants may be divided into a number of yield categories, where, for example, each category may only include plants having yields within a certain percentile range among all the plants, such as every 10%, every 20%, or every 25%. For example, plants with yields among the top 10% of all plants in the population may be included in a first yield category, plants with yields between top 10% and top 20% of all plants may be included in a second yield category, and so on, and plants with yield among the bottom 10% of all plants may be included in a tenth yield category. In some examples, the plants may be divided into a number of yield categories based on their actual yields. For example, plants with a yield of above 300 kg/tree may be included in a first yield category, plants with a yield of between 270-300 kg/tree may be included in a second yield category, and so on, and plants with a yield of below 30 kg/tree may be included in a last yield category.

At block 130, the nutrient and yield data for plants in each yield category may be analyzed to determine a predicted yield as a function of plant nutrient concentration level for each nutrient element. Various machine learning techniques, such as artificial neural network (ANN) modeling or supervised learning techniques, may be used to determine the predicted yield as the function of nutrient concentration level for each nutrient element. The supervised learning techniques may include, for example, logistic regression, support vector machine (SVM), linear or polynomial regression analysis, etc.

At block 140, the computer system may receive user inputs for a specific plant or a specific group of plants. The user input may include, for example, the yield of the specific plant or the group of plants, and/or data of nutrient analysis of plant tissues and soil analysis. In some cases, the user may identify the plant or group of plants as belonging to a productivity category, such as low yield, medium yield, or high yield. The user may determine the plant or the group of plant as belonging to a productivity category using various methods, such as historical data or aerial survey using, for example, unmanned aerial vehicles.

At block 150, based on the yield of the specific plant or the group of plants, the specific plant or the group of plants may be categorized as belonging to one of the yield categories, and the corresponding predicted yield as a function of nutrient concentration level for each nutrient element may be used to determine the optimum nutrient concentration level for each nutrient elements in order to maximize the yield of the specific plant or group of plants. In some embodiments, optimum nutrient concentration levels may be determined to reduce the number of low-yielding or non-yielding trees. In some embodiments, the determined optimum nutrient concentration levels may be cross-checked using the nutrient-yield functions for different productivity categories to determine whether determined optimum nutrient concentration levels can improve yields for tress in other productivity categories or to refine the optimum nutrient concentration levels such that they may work for trees in different productivity categories.

At block 160, the optimum nutrient concentration level for each nutrient element may be provided to the user. In some embodiments, fertilization recommendations may be provided to the user based on the optimum nutrient concentration level, current nutrient concentration levels of the plant tissue, and/or the nutrient concentration levels of the soil. For example, the amount of calcium or other nutrient elements to be added to the soil may be provided to the user.

At block 170, fertilizers may be applied to the plant or the group of plants of a category according to the nutrient level for each nutrient element. For example, the user may fertilize the plant or the group of plants based on the optimum nutrient concentration level of each category for each nutrient element and the actual nutrient concentration level for each nutrient element in the plant tissue. In embodiments where the computer system provides fertilization recommendations to the user, the user may fertilize the plant or the group of plants based on the fertilization recommendations. As described above, the optimum nutrient concentration levels for each nutrient element for plants in different yield categories may be different. Thus, different fertilization strategies may be applied to different plants or different groups of plants in a same orchard for precision fertilization.

It is noted that even though FIG. 1 describes the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

II. Example Analysis Results

As shown in the example analysis results described below, the disclosed methods allow simultaneous optimizations of all nutrient elements for plants having different potential yields based on predictive models, and can provide recommendations on fertilization strategies to plant growers for improved yields. Analysis results also show that the disclosed method can reduce fertilizer cost and improve environmental safety by, for example, reducing unnecessary fertilization and minimizing groundwater contamination from unnecessary fertilization.

For example, the above method may take into account data associated with plants that are non-bearing or that have yielded less than 10 kg per plant. Data may be analyzed to determine the nutrient concentration range in which there are the fewest numbers of low yielding or non-bearing trees, the nutrient concentration range may then be selected to reduce the number of low yielding or non-bearing trees and to optimize the overall fruit yields.

A. Quantile Regression Analysis

Figure 2A:
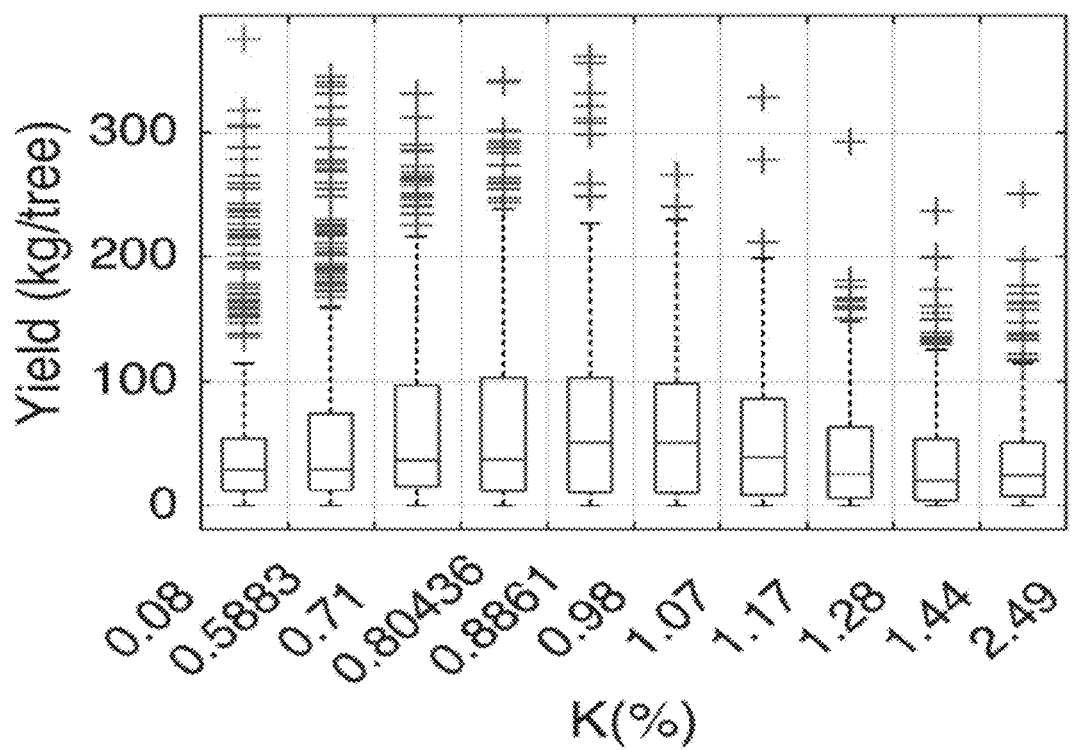
FIG. 2A illustrates the range in yields for trees with increasing levels of leaf potassium concentration.
Figure 2B:
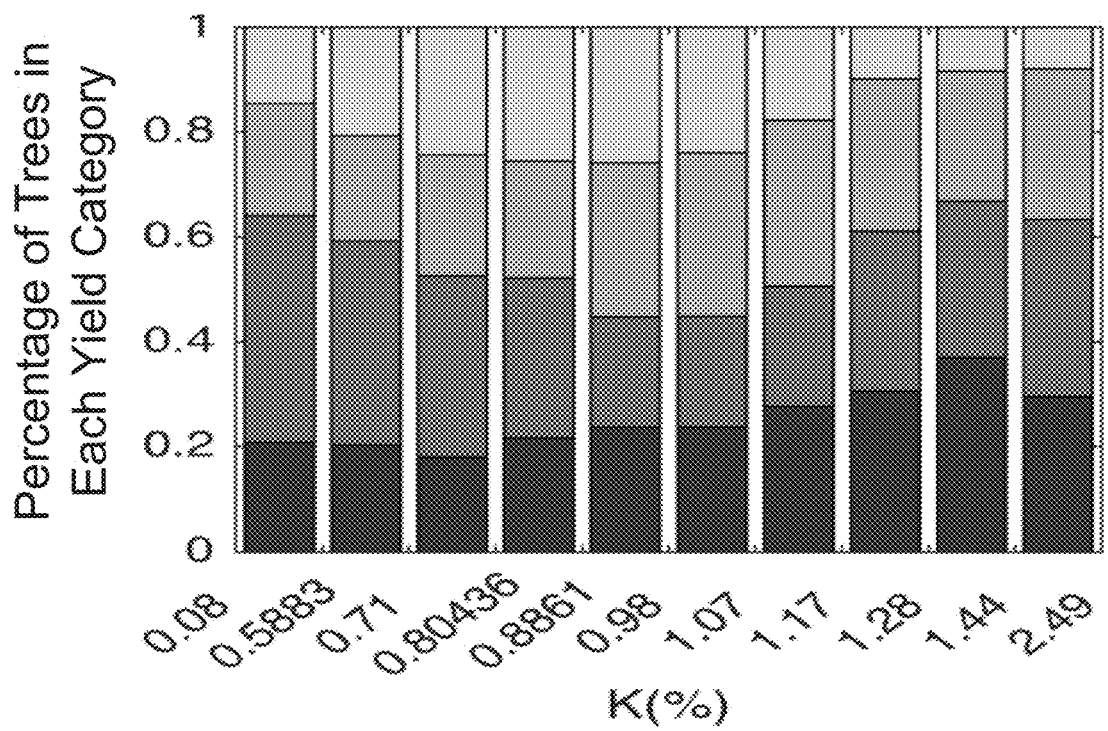
FIG. 2B is a bar plot illustrating the distribution of plants in each yield category for different leaf potassium concentration categories.

FIGS. 2A and 2B illustrate avocado fruit yields in relation to leaf potassium (K) concentration levels for trees sorted into bins corresponding to different leaf potassium concentration ranges, where the number of trees in each leaf potassium concentration range is about 10% of the population in the data set. FIG. 2A illustrates the range in yields for trees with increasing levels of leaf potassium concentration. The vertical boxes in FIG. 2A show the range of yield values for 50% of the trees in the population (from the 25th to the 75th percentile according to their yields). The red horizontal lines within the blue boxes indicate the median yields that occur in the population of trees having that leaf potassium concentration level. The value for 'Whisker' corresponds to approximately +/−2.7 standard deviations from the mean or 99.3% coverage if the data are normally distributed. The plotted whisker extends to the value that is the most extreme data value but is not an outlier. Data points above the blue boxes represent outliers (i.e. extremely rare realizations with estimated probability less than 1%) that are shown as the red cross data points above boxes for each nutrient range category. For potassium, FIG. 2A shows that the highest median yield is associated with trees having leaf K concentration levels of about 0.98% to about 1.07%.

FIG. 2B is a bar plot illustrating the distribution of plants in each yield category for different leaf potassium concentration categories. FIG. 2B may be used to determine the nutrient concentration levels at which the greatest number of trees are bearing fruit, thus decreasing the number of low yielding or non-yielding trees. In FIG. 2B, the segmented columns are color-coded to represent the proportion of trees (y axis) in each yield category for each nutrient concentration range (x axis). In any given year, about 20 to 30% of the trees in the population may be in an "OFF" cycle in which they produce less than 10 kg of fruit per tree. These trees are grouped in the lowest yield category and are denoted in FIG. 2B as the dark blue segments of the columns. Trees producing from about 10 to about 40 kg per tree are shown in FIG. 2B as the light blue segments of the columns, trees producing about 40-100 kg per tree are shown in FIG. 2B as the green segments of the columns, and trees producing above 100 kg per tree are shown in FIG. 2B as the yellow segments of the columns. In the results shown in FIGS. 2A and 2B, K concentration levels in the bin categories from about 0.71% to about 1.07% may maximize the probability of having the largest proportion of high yielding trees (in yellow) and the lowest proportion of low yielding trees (in dark blue). Therefore, leaf K concentration levels from about 0.71% to about 1.07% may be the optimal or preferable growth conditions as each bin category includes about 1/10 of the population and about 40% of trees are in optimal or preferable growth conditions. Within the optimal or preferable range, the highest probability of low yielding trees (dark blue) occurs when the leaf K concentration level is between about 0.71% and about 0.88%, while the highest probability of high yielding trees occurs when the leaf K concentration level is between about 0.88% and about 1.07%. Thus, the conservative optimum for maximum orchard yield may be identified here as 0.88%. By increasing the number of trees having leaf K concentration levels within the identified range, the industry would increase total production, and the number of low yielding trees may be reduced.

As described above, an envelope analysis quantifies plant nutrient-yield responses for the best performing plants in a population, such as the top 5% of the population. These trees may produce as much as over 300 kg of fruit per tree, but they represent only 5% or less of the trees in an orchard. Using methods disclosed herein, improvements to plant production can be made for trees at different productivity categories. As shown in FIGS. 2A and 2B, the median tree is one that produces about 30 to about 50 kg of fruit, and may have a slightly different optimum leaf K concentration level than that for the highest producing trees. The analysis using the disclosed method can thus provide insight into the nutritional requirements for trees that have inherently different yield potentials due to other environmental constraints. By both optimizing the nutrient concentration levels for the high-yielding trees and reducing the numbers of low-yielding trees, the overall yield can be improved.

Figure 3A:
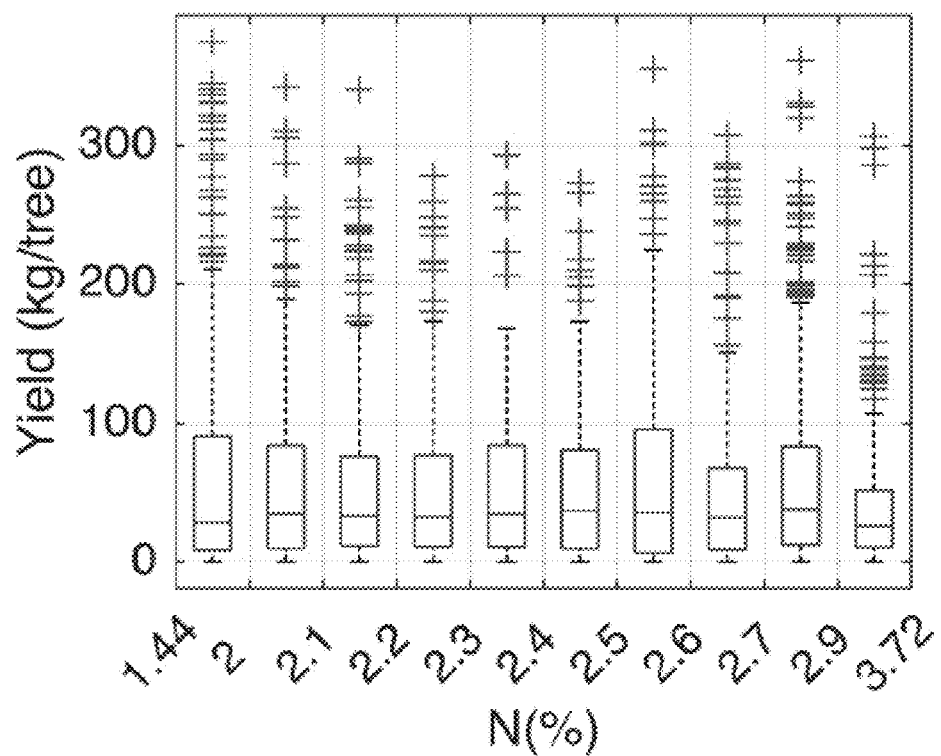
FIG. 3A illustrates the range in yields for trees with increasing levels of leaf nitrogen concentration.
Figure 3B:
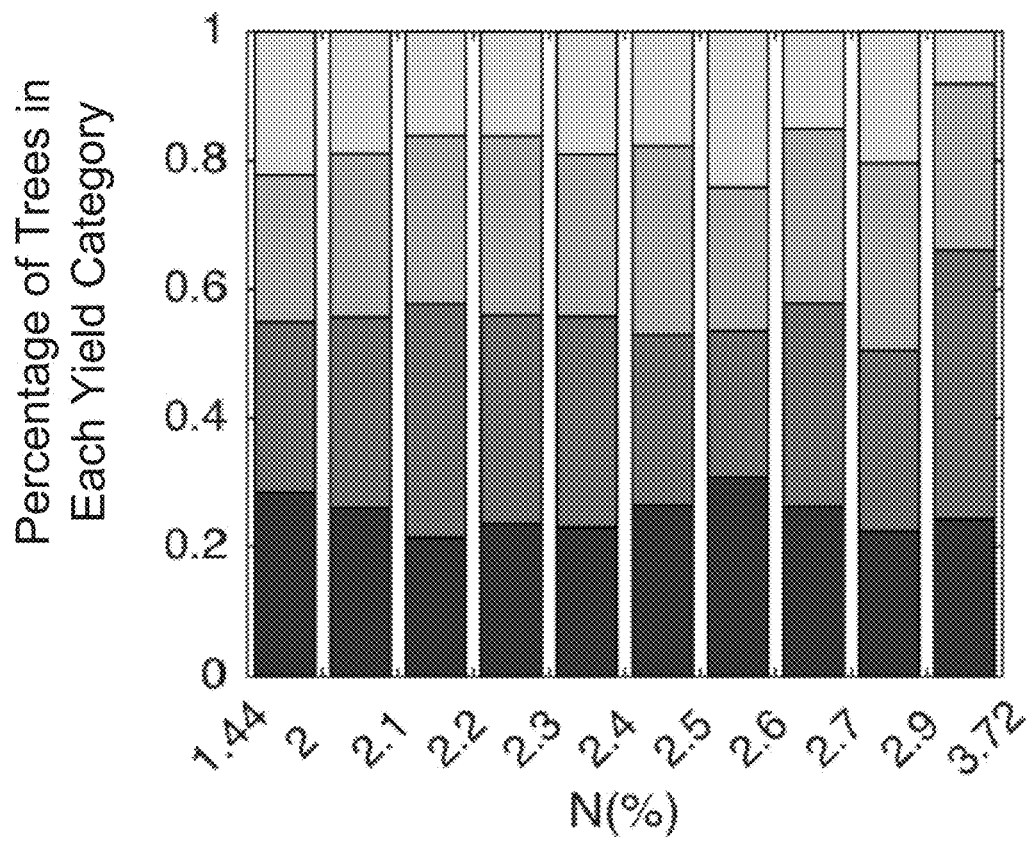
FIG. 3B is a bar plot illustrating the distribution of plants in each yield category for different leaf nitrogen concentration categories.

FIGS. 3A and 3B illustrate avocado fruit yields in relation to leaf nitrogen (N) concentration levels for trees sorted into categories corresponding to different leaf nitrogen concentration ranges, where the number of trees in each leaf nitrogen concentration range is about 10% of the population in the data set. FIG. 3A illustrates the range in yields for trees at increasing levels of leaf nitrogen concentration. FIG. 3B is a bar plot illustrating the distribution of plants in each yield category for different leaf nitrogen concentration categories. FIGS. 3A and 3B show that the level of leaf nitrogen concentration has little apparent influence on fruit yields, but leaf nitrogen concentration levels above 2.6% may be associated with decreasing numbers of high yielding trees that can produce more than 100 kg of fruit. Lower yields may also occur for trees having leaf N concentration of greater than 2.9%, but there are relatively few trees having this high level of leaf nitrogen concentration. FIGS. 3A and 3B also show that, across the industry, 90% of the avocado trees have leaf nitrogen concentration levels between about 2.0% and about 2.9%. Within this range, the lowest number of low-yielding trees (dark blue) occurs at leaf nitrogen concentration levels of about 2.1-2.2%. The highest number of high-yielding trees occurs at leaf nitrogen concentration levels of about 2.5-2.6% (where a corresponding high number of low yielding trees suggests increasing number of alternate-bearing trees, i.e., trees in OFF cycle). Overall, conservative optimum level of leaf nitrogen concentration for maximum orchard yield may be set to about 2.4%.

Figure 4A:
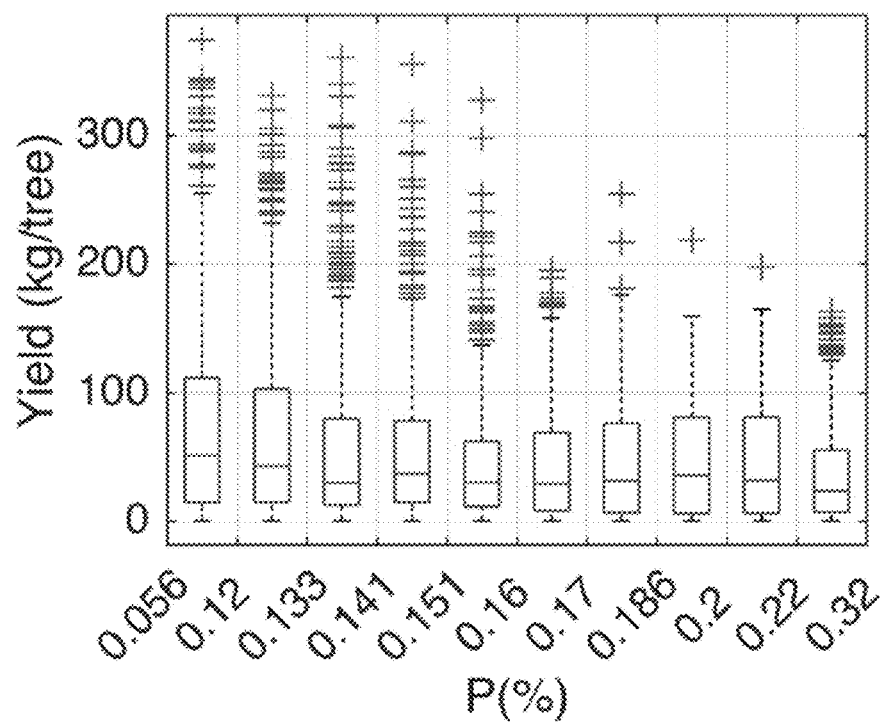
FIG. 4A illustrates the range in yields for trees with increasing levels of leaf phosphorus concentration.
Figure 4B:
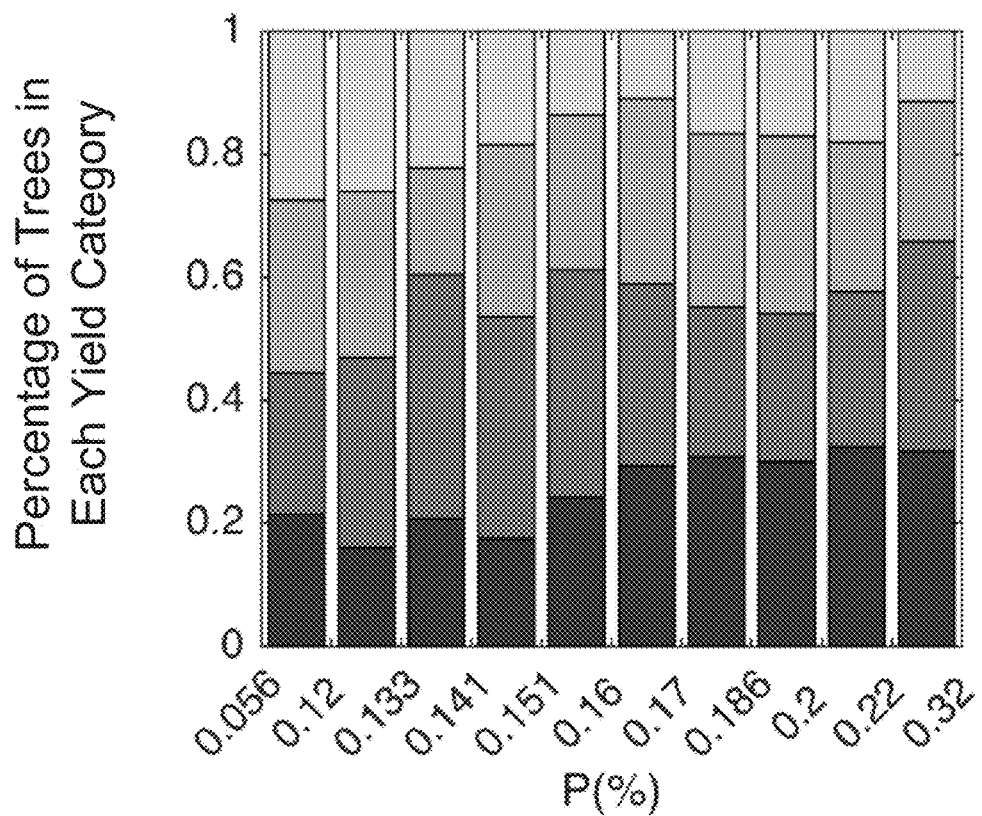
FIG. 4B is a bar plot illustrating the distribution of plants in each yield category for different leaf phosphorus concentration categories.

FIGS. 4A and 4B illustrate avocado fruit yields in relation to leaf phosphorus (P) concentration levels for trees sorted into categories corresponding to different leaf phosphorus concentration ranges, where the number of trees in each leaf phosphorus concentration range is about 10% of the population in the data set. FIG. 4A illustrates the range in yields for trees with increasing levels of leaf phosphorus concentration. FIG. 4B is a bar plot illustrating the distribution of plants in each yield category for different leaf phosphorus concentration categories.

FIG. 4A shows that the production for the highest yielding trees follows a downward curve with respect to the leaf phosphorus concentration level, with a minimum at a leaf phosphorus concentration level of about 1.15-1.16% and relative low yield potentials at leaf phosphorus concentration levels higher than about 1.16%. The yields for the majority of the trees (75% of trees represented by the top side of the blue boxes) show a relatively flat response to the leaf P concentration level, but that the highest median production occurs at leaf phosphorus concentration levels of about 0.14-0.15%.

FIG. 4B shows that the numbers of trees in the highest yield category (yellow) decrease with increasing leaf P concentration levels, and the lowest proportion of low yielding trees occurs at leaf P concentration levels within about 0.13 to 0.15%, which may be identified as the target range that can optimize the yield potential at the orchard level.

Figure 5A:
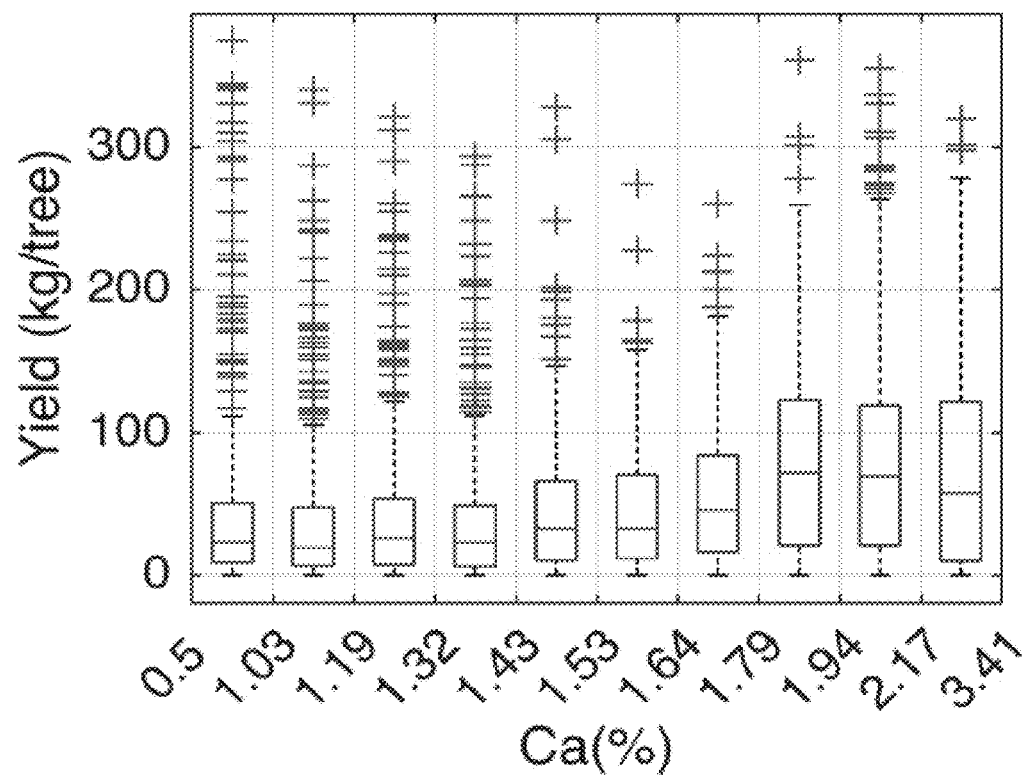
FIG. 5A illustrates the range in yields for trees with increasing levels of leaf calcium concentration.
Figure 5B:
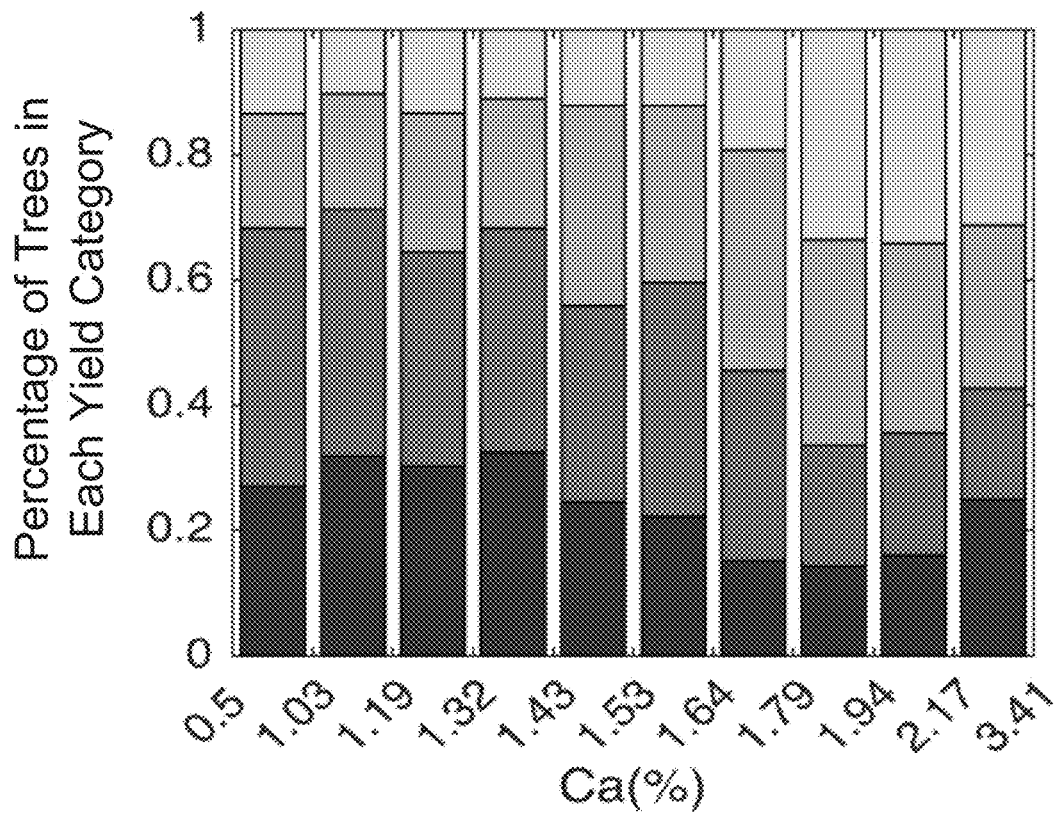
FIG. 5B is a bar plot illustrating the distribution of plants in each yield category for different leaf calcium concentration categories.

FIGS. 5A and 5B illustrate avocado fruit yields in relation to leaf calcium (Ca) concentration levels for trees sorted into categories corresponding to different leaf calcium concentration ranges, where the number of trees in each leaf calcium concentration range is about 10% of the population in the data set. FIG. 5A illustrates the range in yields for trees with increasing levels of leaf calcium concentration. FIG. 5B is a bar plot illustrating the distribution of plants in each yield category for different leaf calcium concentration categories. FIGS. 5A and 5B show that high yields are consistently associated with increased levels of leaf Ca concentration. High-yielding trees may have a leaf calcium concentration level of up to about 3.4%. The numbers of low yielding trees (dark blue) decrease to a minimum for trees having leaf calcium concentration levels of about 1.6 to 1.94%. However, an increasing proportion of trees may become nonbearing at the highest leaf Ca concentration levels. The data shown in FIG. 5A suggests a target leaf calcium concentration level of about 1.9-2.2% for maximum orchard yield potential.

Figure 6A:
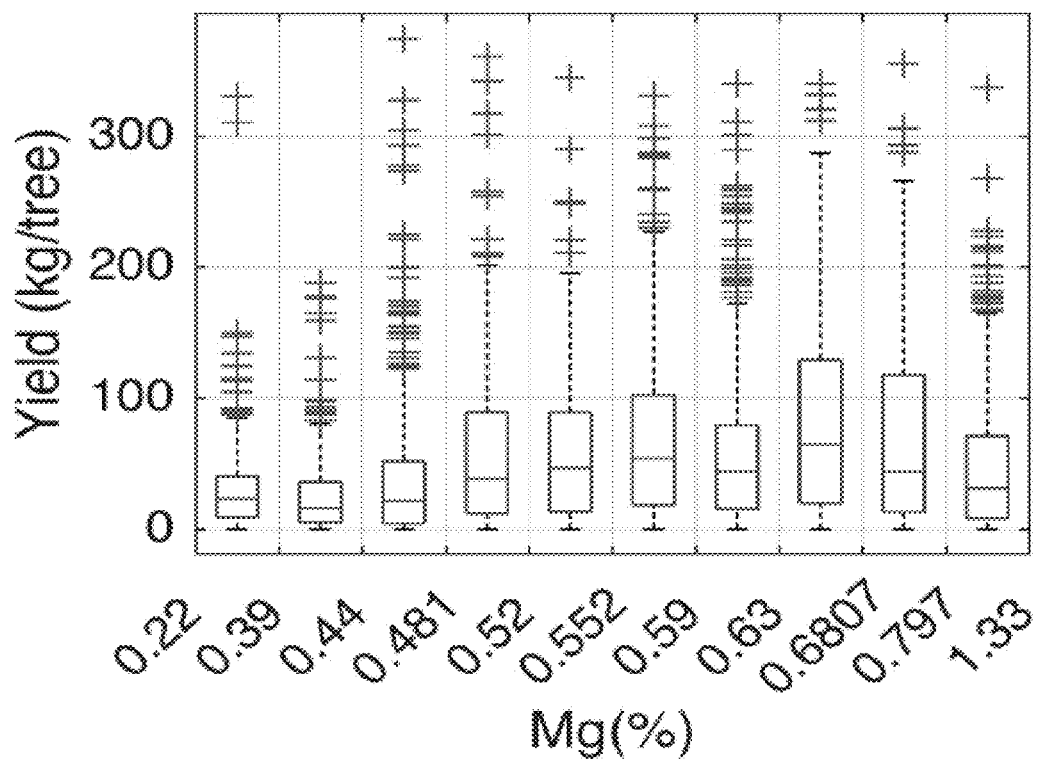
FIG. 6A illustrates the range in yields for trees with increasing levels of leaf magnesium concentration.
Figure 6B:
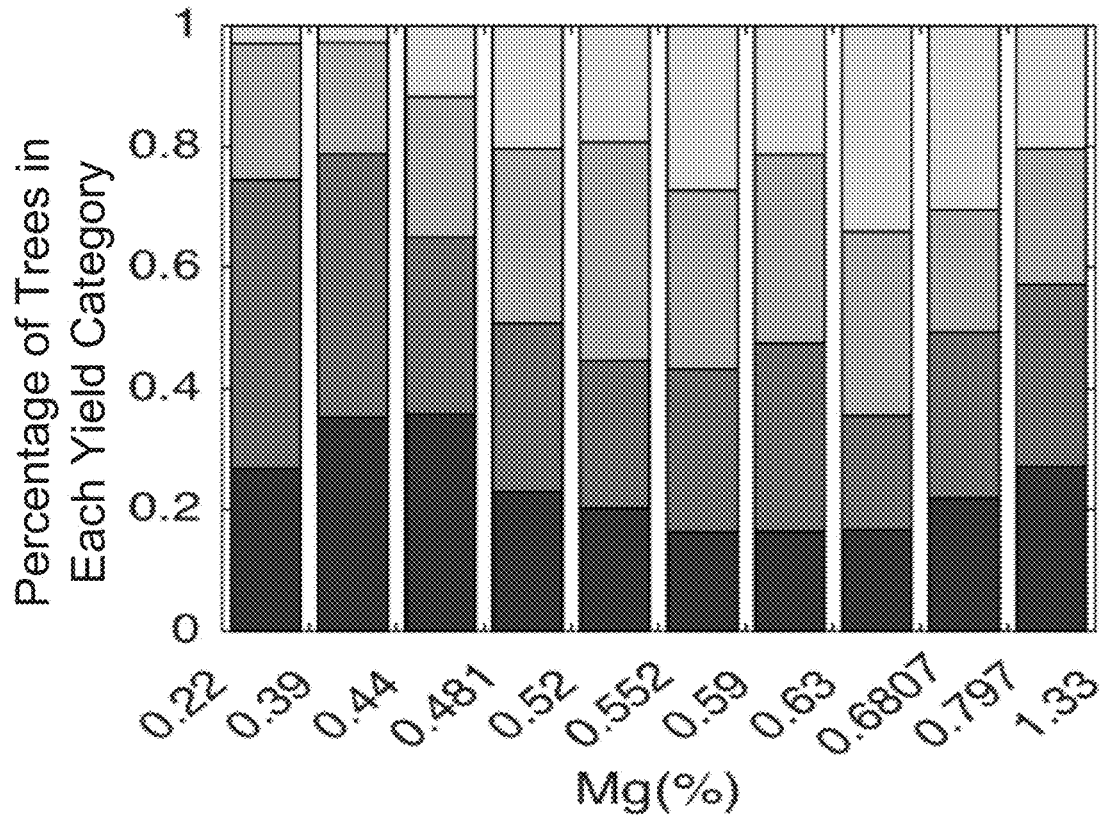
FIG. 6B is a bar plot illustrating the distribution of plants in each yield category for different leaf magnesium concentration categories.

FIGS. 6A and 6B illustrate avocado fruit yields in relation to leaf magnesium (Mg) concentration levels for trees sorted into categories corresponding to different leaf magnesium concentration ranges, where the number of trees in each leaf Mg concentration range is about 10% of the population in the data set. FIG. 6A illustrates the range in yields for trees with increasing levels of leaf magnesium concentration. FIG. 6B is a bar plot illustrating the distribution of plants in each yield category for different leaf magnesium concentration categories. FIGS. 6A and 6B show that high yields are consistently associated with increased levels of leaf magnesium concentration. High yielding trees may have leaf magnesium concentration levels within about 0.6-0.68%. The numbers of low yielding trees (dark blue) decrease to a minimum for trees having leaf magnesium concentration levels within about 0.55-0.68%. However, an increasing proportion of trees may become nonbearing at the highest leaf Mg concentration levels. The data shown in FIG. 6B suggest a target leaf magnesium concentration level of about 0.6-0.68% for maximum orchard yield potential.

Figure 7A:
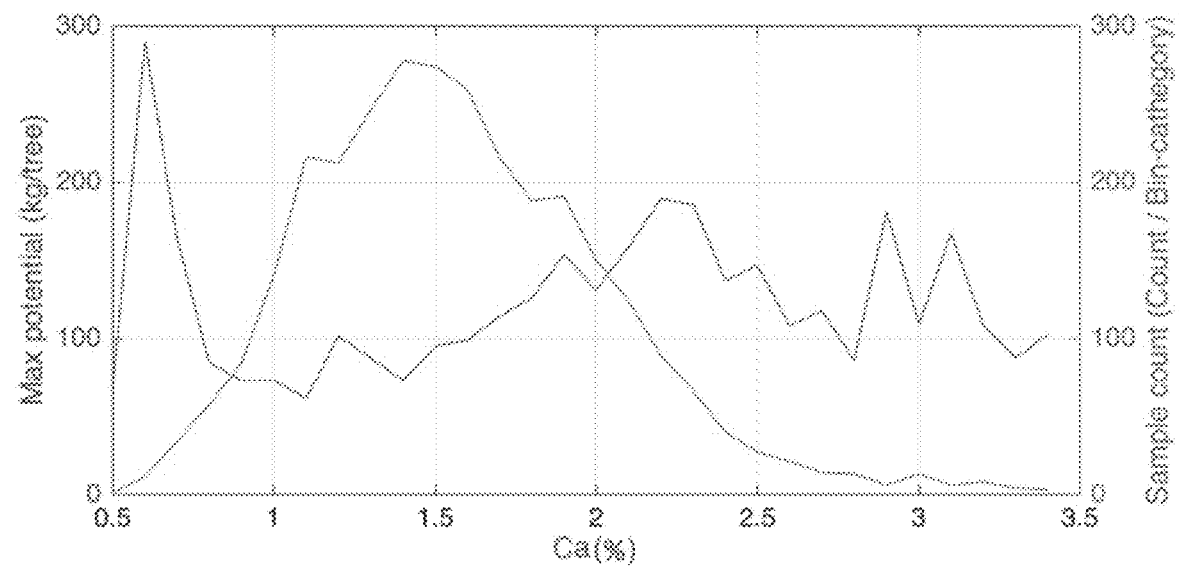
FIG. 7A illustrates a yield curve with respect to the leaf calcium (Ca) concentration level for top 5% producing trees (blue line) and the distribution of individual trees having different levels of leaf calcium concentration (red line).

FIG. 7A illustrates a yield curve with respect to the leaf calcium concentration for the top 5% producing trees (blue line) and the distribution of individual trees having different levels of leaf Ca concentration (red line). As shown in FIG. 7A, the trees represented by the collected data set (representing the avocado production industry) have an average leaf calcium concentration level of about 1.4% (red line). The yield potential may be more than doubled from about 80 kg for trees at a leaf calcium concentration level of about 1% to about 190 kg at a leaf calcium concentration level of about 2.2%, which suggests that the leaf Ca concentration levels are low across the industry.

Figure 7B:
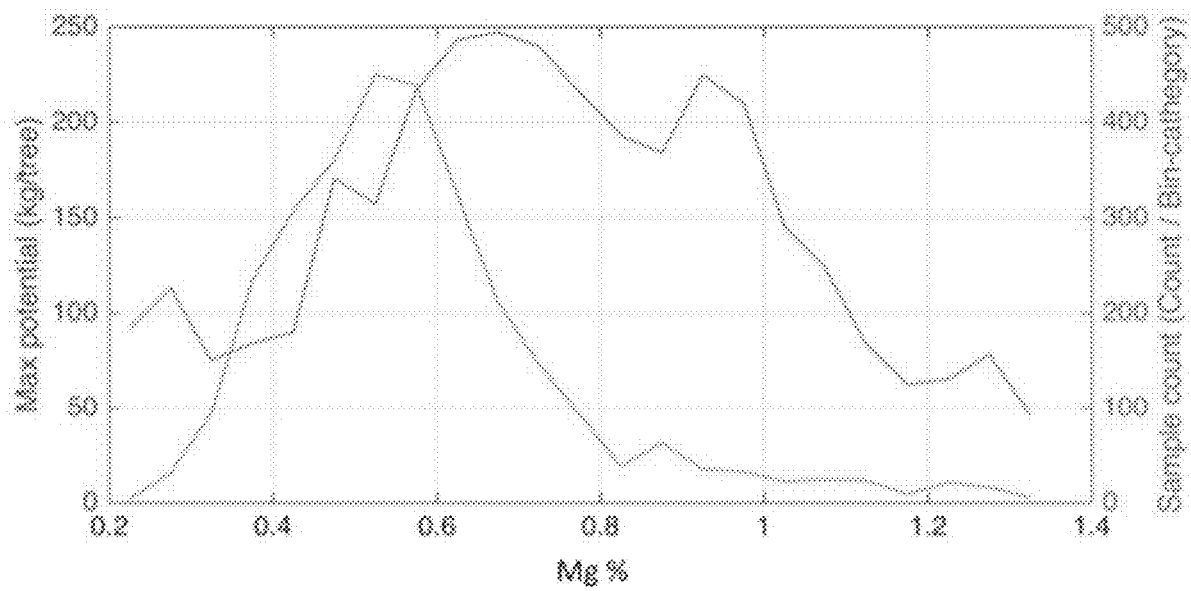
FIG. 7B illustrates a yield curve with respect to a leaf magnesium (Mg) concentration level for top 5% producing trees (blue line) and the distribution of individual trees having different levels of Mg (red line).

FIG. 7B illustrates a yield curve with respect to the leaf magnesium concentration for the top 5% producing trees (blue line) and the distribution of individual trees having different levels of Mg (red line). FIG. 7B shows that magnesium deficiencies are also evident for approximately ⅓ of the trees which have leaf Mg concentration levels below 0.4%. The trees represented by the collected data set (representing the avocado production industry) have an average leaf magnesium concentration level of about 0.5% Ma (red line). Yield potentials for the top performing trees can be improved from about 90 kg to about 250 kg per tree with leaf Mg concentration levels in the recommended range of from about 0.6% to about 0.8%. As shown in FIGS. 6A and 6B, the greatest number of trees in ON cycle may be found when the leaf magnesium concentration levels are within a range from about 0.6% to about 0.68%. The above data suggests that the leaf Mg concentration levels are generally low across the industry.

FIGS. 7A-7B indicate that calcium and magnesium show the same general yield response patterns, and increases in calcium and magnesium fertilization across the board for most trees are generally recommended. However, the analysis on nutrient interactions also indicates that growers should also consider maintaining a ratio between leaf Ca concentration level and leaf Mg concentration level in a range from about 3:1 to about 2:1.

Figure 8:
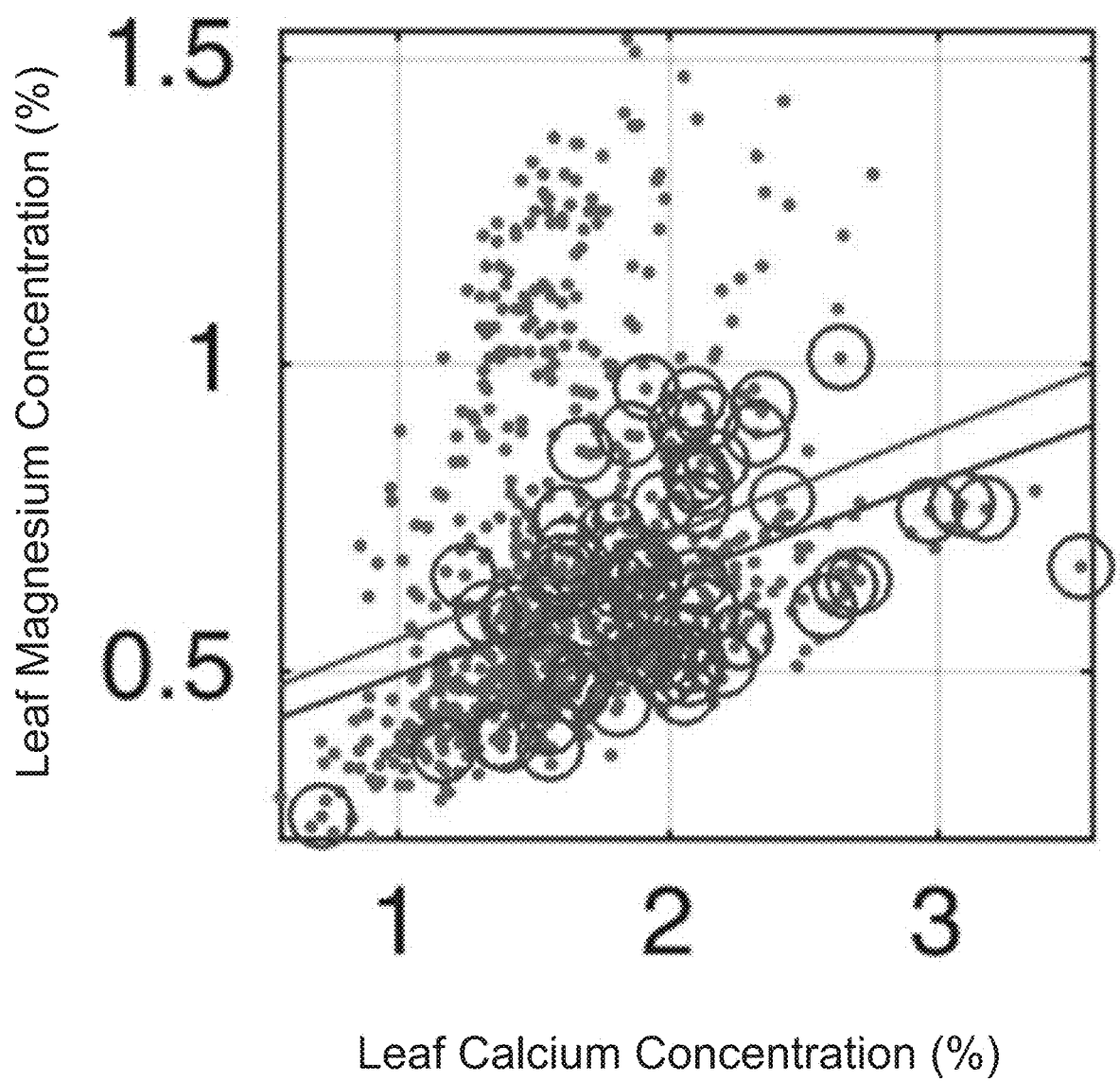
FIG. 8 illustrates avocado yield potentials in relation to a ratio between the leaf calcium concentration and the leaf magnesium concentration.

FIG. 8 illustrates avocado yield potentials in relation to the ratio between leaf calcium concentration and leaf magnesium concentration. In FIG. 8, large blue circles indicate high yielding trees, and the red dots represent trees that have a yield of less than about 40 kg per tree. It is desirable to keep the ratio between the leaf calcium concentration and leaf magnesium concentration to the region highlighted by the red and blue lines for a higher number of high-yielding trees. For example, a high level of leaf magnesium concentration (e.g., 1.5%) may not necessarily improve the yield if the leaf calcium concentration level is low (e.g., 2.0%), but may cause excess magnesium in leaf or soil. Excess magnesium in clay soils may lead to soil aggregate dispersion and drainage problems.

Figure 9A:
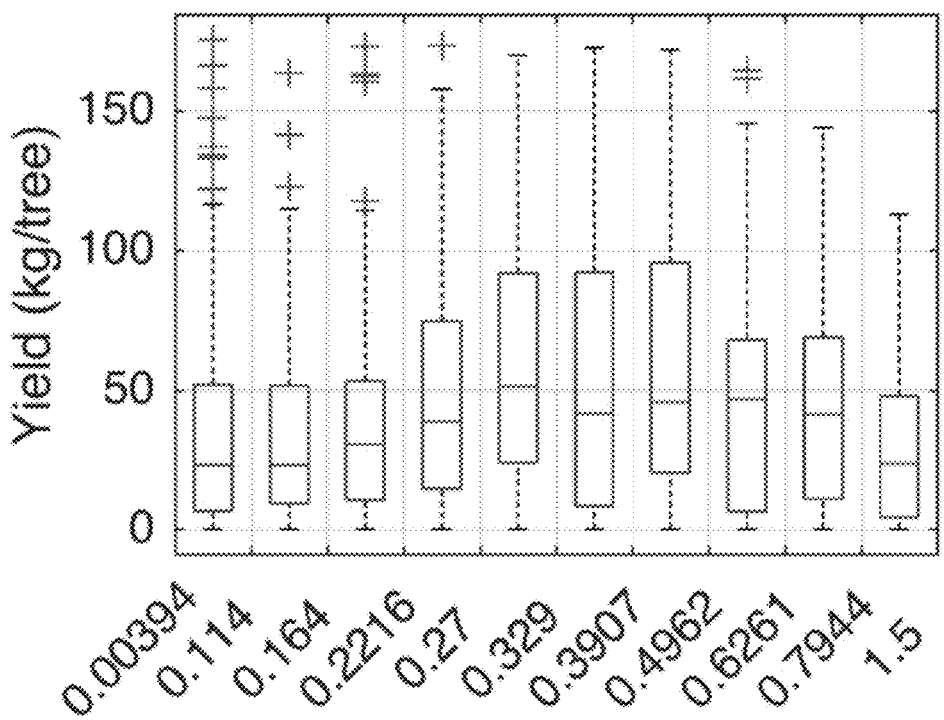
FIG. 9A illustrates the range in yields for avocado trees with increasing levels of leaf chloride concentration.
Figure 9B:
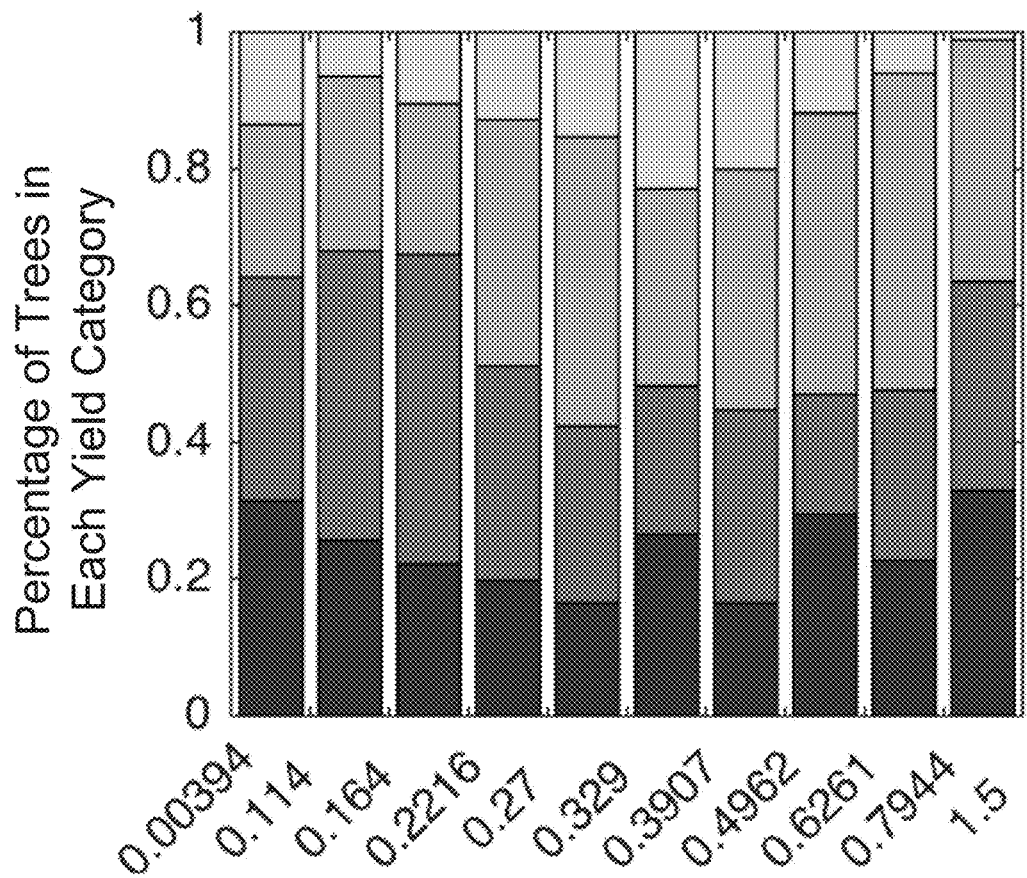
FIG. 9B is a bar plot illustrating the distribution of plants in each yield category for different leaf chloride concentration categories.

FIGS. 9A and 9B illustrate avocado fruit yields in relation to leaf chloride (Cl) concentration levels for trees sorted into categories corresponding to different leaf chloride concentration ranges. FIG. 9A illustrates the range in yields for trees with increasing levels of leaf chloride concentration. FIG. 9B is a bar plot illustrating the distribution of plants in each yield category for different leaf chloride concentration categories. FIG. 9A shows that the production for the highest yielding trees decreases for trees having a leaf Cl concentration level of above 0.5% and the top 50% of best performing trees in the data set have leaf Cl concentration levels between about 0.2% and about 0.5%. FIG. 9B shows that, for the trees in the data set, the greatest number of high yielding trees occurs in trees having leaf Cl concentration levels of between about 0.3% and about 0.5%. At leaf Cl concentration levels above 0.6%, the number of high yielding trees decreases sharply, with approximately 30% of the trees becoming low-yielding or non-bearing.

Figure 10B:
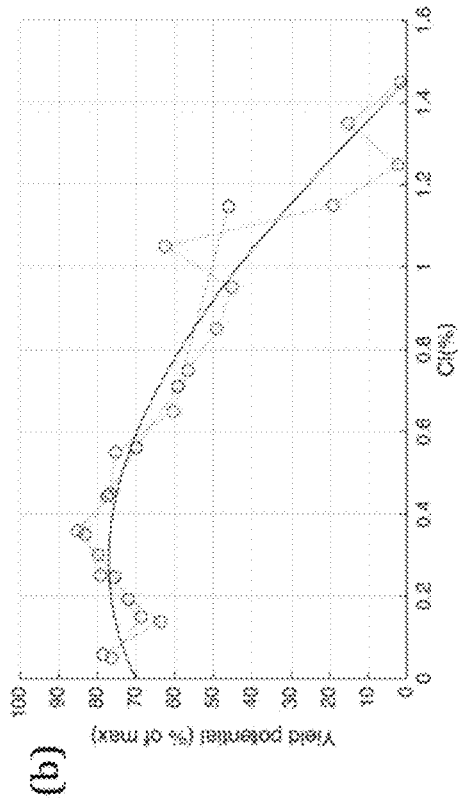
FIG. 10B illustrates yield potentials with respect to leaf chloride concentration levels for trees in the top 5% production category.
Figure 10D:
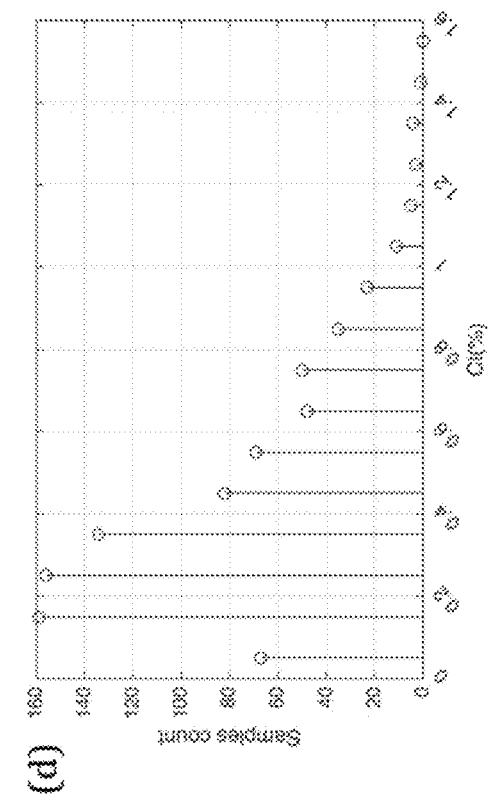
FIG. 10D illustrates the number of trees in each equally divided leaf chloride concentration range.
Figure 10A:
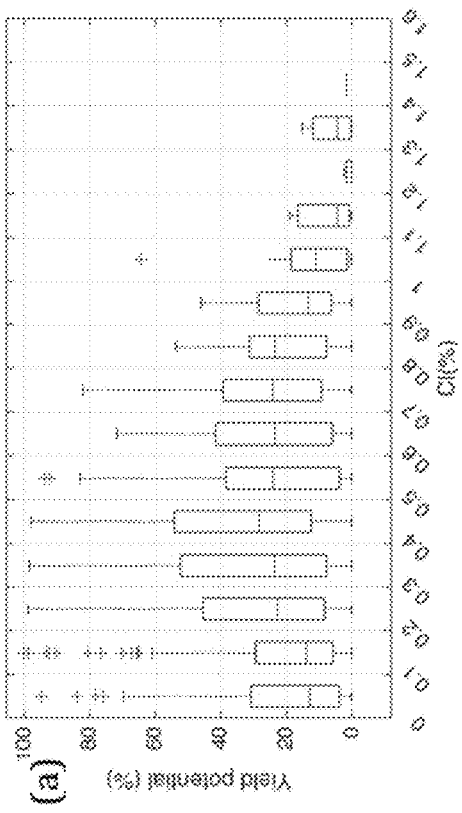
FIG. 10A illustrates yield potentials for trees with different leaf chloride concentration levels.
Figure 10C:
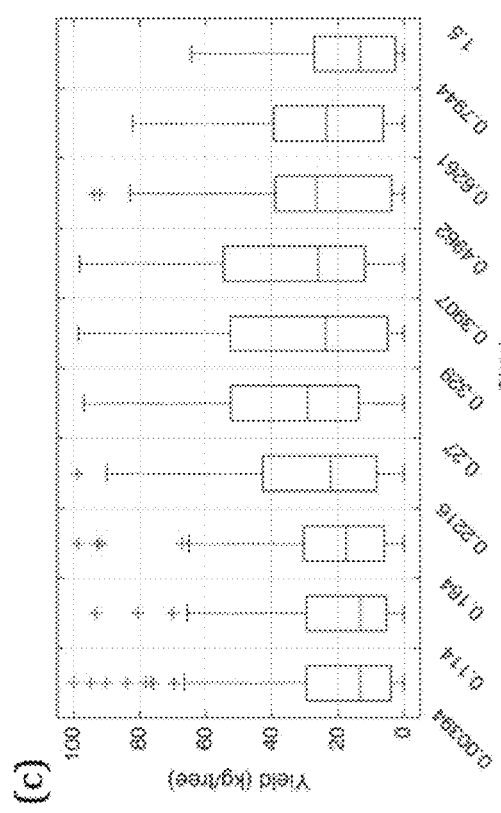
FIG. 10C illustrates yield potentials for trees having leaf chloride concentration level within different ranges, where the number of trees in each leaf chloride concentration range is about 10% of the total number of tree in the data set.

FIGS. 10A-10D illustrate analysis results on yield potentials with respect to leaf chloride (Cl) concentration levels. FIG. 10A illustrates yield potentials for trees with different leaf chloride concentration levels, where trees are binned based on their leaf chloride concentration levels at a step of about 0.1% per bin. FIG. 10B illustrates yield potentials with respect to leaf chloride concentration levels for trees in the top 5% production category. FIG. 10C illustrates yield potentials for trees having leaf chloride concentration level within different ranges, where the number of trees in each leaf chloride concentration range is about 10% of the total number of tree in the data set. FIG. 10D illustrates the number of trees in each equally divided leaf chloride concentration range. The data points used to generate the response curves are obtained by binning the trees according to their nutritional condition for a selected nutrient element. To obtain curves that are unbiased by the sampling strategy, the trees are binned both by constant incremental changes in the nutrient concentration level (FIG. 10A) and by equal number of trees in the nutrient concentration range (FIG. 10C). The sample count associated with each nutrient bin category are provided in FIG. 10D, which may be useful for determining the center point of the population and range and mean nutritional condition of trees across the industry. The numerical data can also be used to estimate the numbers of trees that are above or below their optimum nutritional conditions for each nutrient element. For example, it is estimated that approximately 30% of the industry is affected by chloride toxicity based on the analysis results.

Figure 11B:
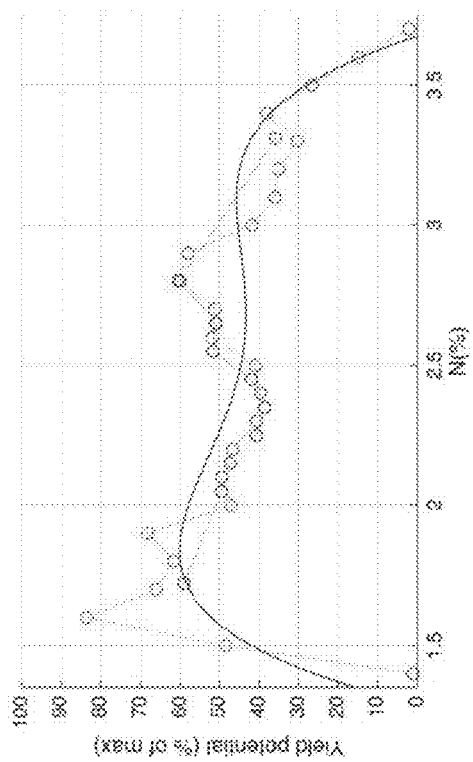
FIG. 11B illustrates yield potentials with respect to leaf nitrogen concentration levels for trees in the top 5% production category.
Figure 11D:
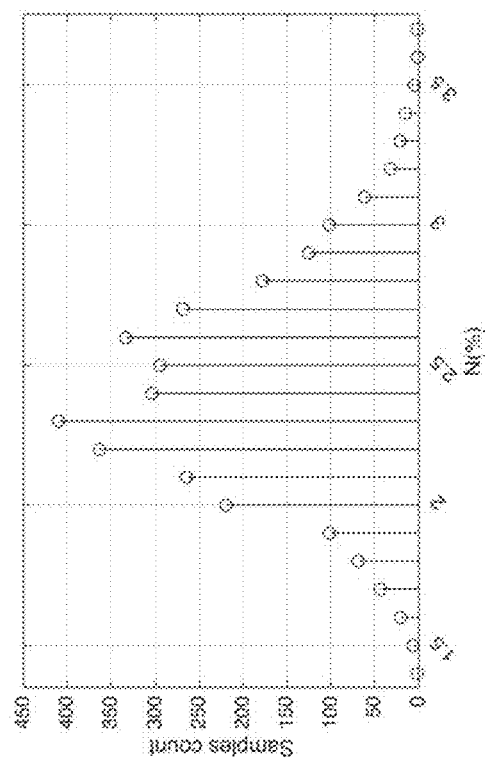
FIG. 11D illustrates the number of trees in each equally divided leaf nitrogen concentration range.
Figure 11A:
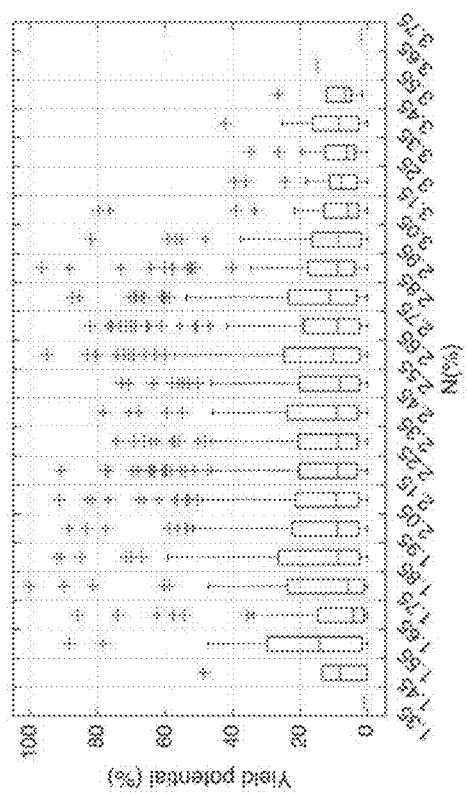
FIG. 11A illustrates yield potentials for trees with different leaf nitrogen concentration levels, where trees are binned based on their leaf nitrogen concentration levels at a step of about 0.10% per bin.
Figure 11C:
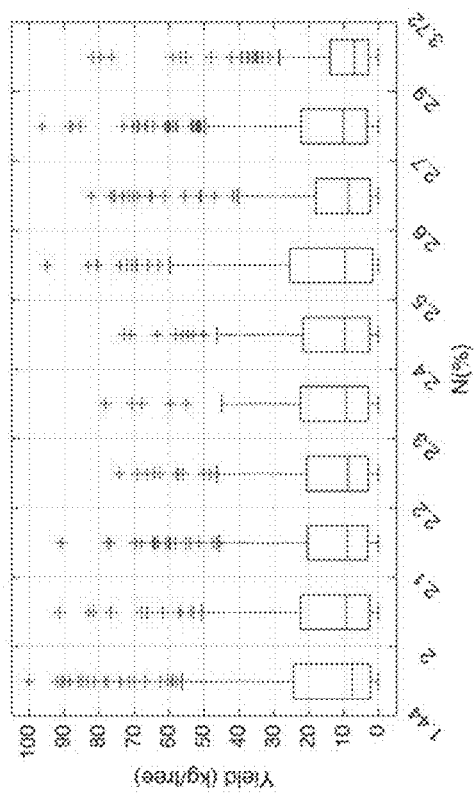
FIG. 11C illustrates yield potentials for trees having leaf nitrogen concentration levels within different ranges, where the number of trees in each leaf nitrogen concentration range is about 10% of the total number of tree in the data set.

FIGS. 11A-11D illustrate analysis results on yield potentials with respect to leaf nitrogen (N) concentration levels. FIG. 11A illustrates yield potentials for trees with different leaf nitrogen concentration levels, where trees are binned based on their leaf nitrogen concentration levels at a step of about 0.1% per bin. FIG. 11B illustrates yield potentials with respect to leaf nitrogen concentration levels for trees in the top 5% production category. FIG. 11C illustrates yield potentials for trees having leaf nitrogen concentration levels within different ranges, where the number of trees in each leaf nitrogen concentration range is about 10% of the total number of tree in the data set. FIG. 11D illustrates the number of trees in each equally divided leaf nitrogen concentration range. Note that approximately ⅓ of the trees in the population have leaf nitrogen concentration levels below the 2.2-2.4% range that corresponds to maximum yield potential. Another ⅓ of trees have leaf N concentration levels above the optimum range. Nonetheless, the impact on yields is relatively small until very high levels of leaf nitrogen concentration occur, which may occur for only a small number of trees.

Figure 12A:
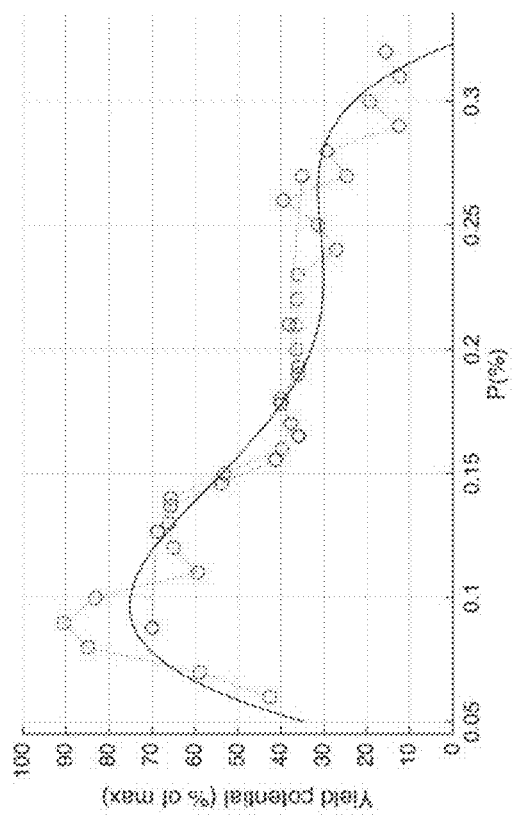
FIG. 12A illustrates yield potentials for trees with different leaf phosphorus concentration levels, where trees are binned based on their leaf phosphorus concentration levels at a step of about 0.1% per bin.
Figure 12B:
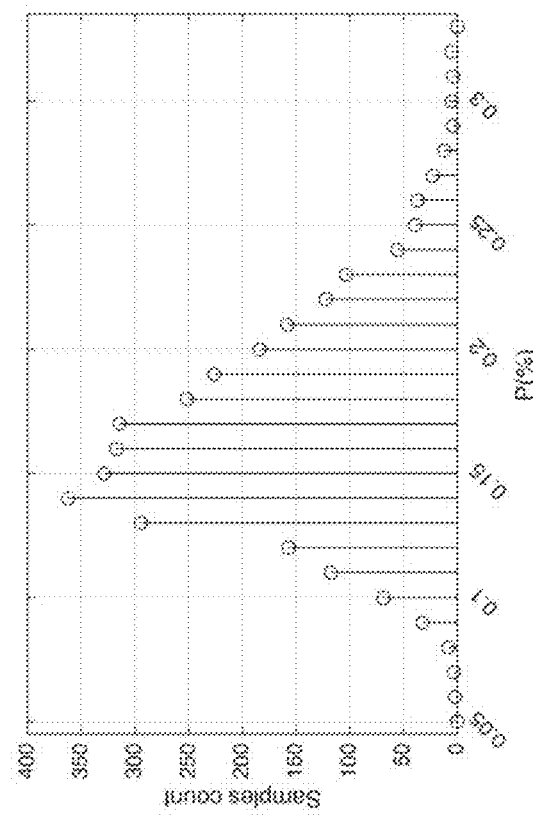
FIG. 12B illustrates yield potentials with respect to leaf phosphorus concentration levels for trees in the top 5% production category.
Figure 12C:
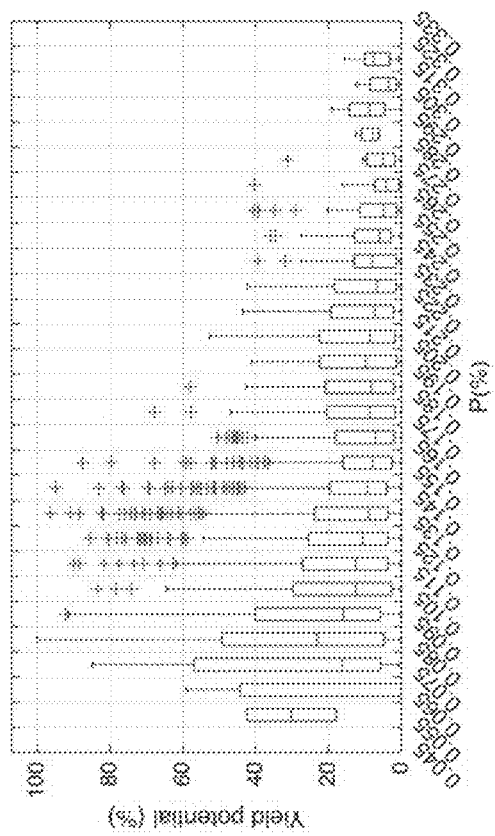
FIG. 12C illustrates yield potentials for trees having leaf phosphorus concentration levels within different ranges, where the number of trees in each leaf phosphorus concentration range is about 10% of the total number of tree in the data set.
Figure 12D:
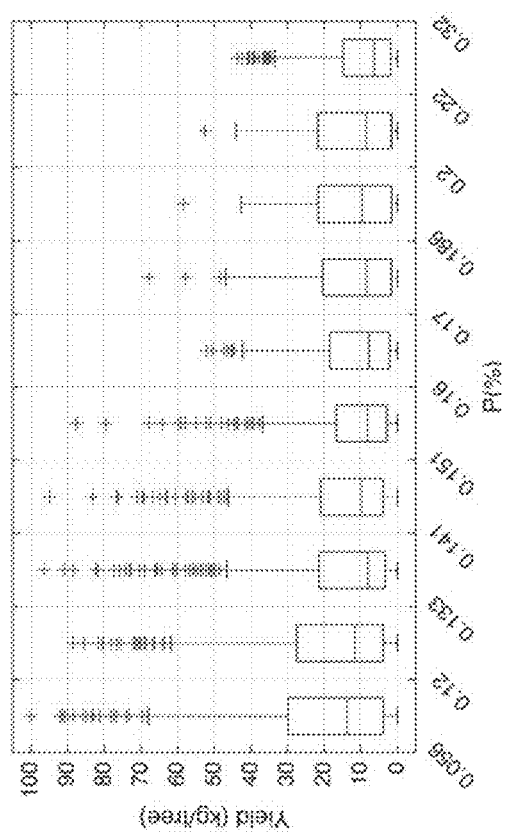
FIG. 12D illustrates the number of trees in each equally divided leaf phosphorus concentration range.

FIGS. 12A-12D illustrate analysis results on yield potentials with respect to leaf phosphorus (P) concentration levels. FIG. 12A illustrates yield potentials for trees with different leaf phosphorus concentration levels, where trees are binned based on their leaf phosphorus concentration levels at a step of about 0.1% per bin. FIG. 12B illustrates yield potentials with respect to leaf phosphorus concentration levels for trees in the top 5% production category. FIG. 12C illustrates yield potentials for trees having leaf phosphorus concentration levels within different ranges, where the number of trees in each leaf phosphorus concentration range is about 10% of the total number of tree in the data set. FIG. 12D illustrates the number of trees in each equally divided leaf phosphorus concentration range. The analysis results show that approximately ⅓ of the trees in the population have leaf phosphorus concentration levels in the optimum range of 0.13-0.15% determined using the optimization described above with respect to FIG. 4B. Approximately 20% of the trees are low in leaf phosphorus concentration, and 50% of the trees have leaf phosphorus concentration levels that may be excessive for obtaining the maximum yield potential. While yields for the top producing trees may not decrease until the leaf phosphorus concentration level is greater than about 0.22%, the number of low-yielding or non-bearing trees increases rapidly as the leaf phosphorus concentration level increases to above about 0.16%.

Figure 13A:
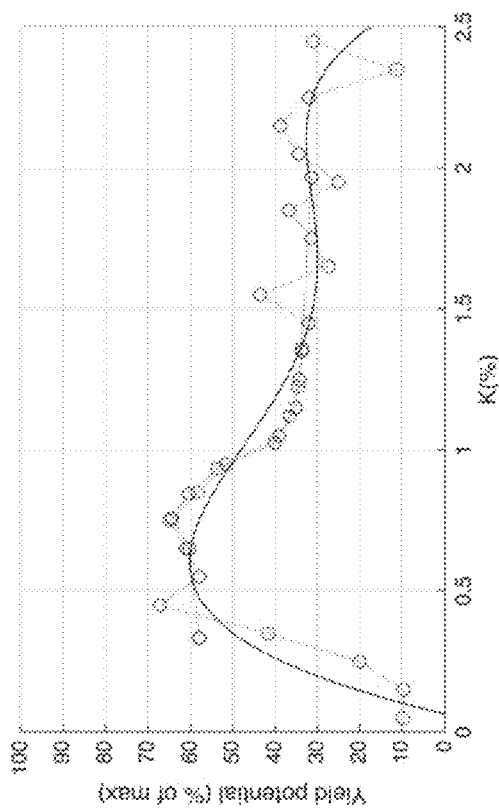
FIG. 13A illustrates yield potentials for trees with different leaf potassium concentration levels, where trees are binned based on their leaf potassium concentration levels at a step of about by 0.1% per bin.
Figure 13B:
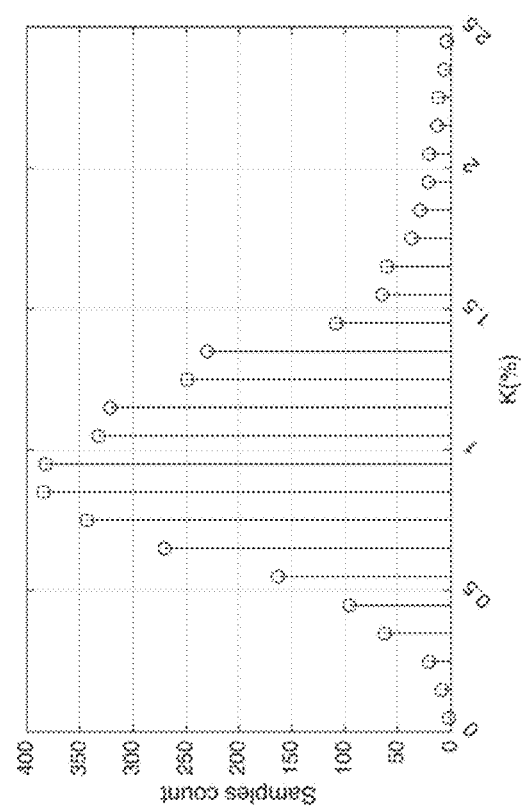
FIG. 13B illustrates yield potentials with respect to leaf potassium concentration levels for trees in the top 5% production category.
Figure 13C:
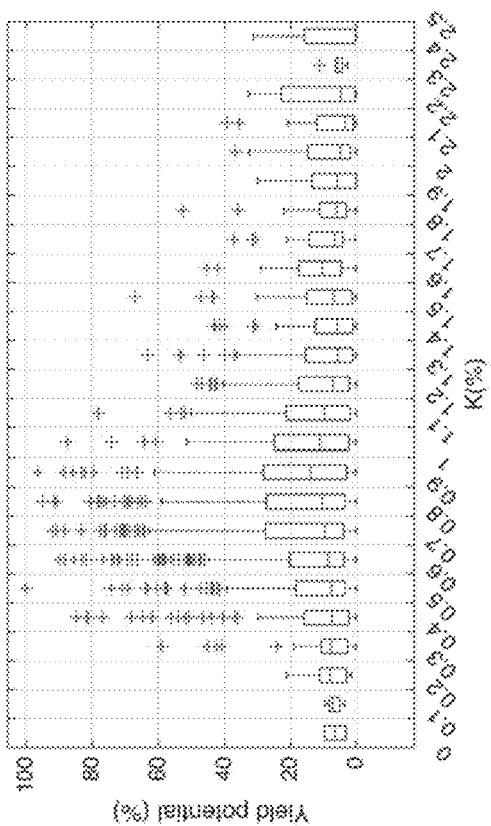
FIG. 13C illustrates yield potentials for trees having leaf potassium concentration levels within different ranges, where the number of trees in each leaf potassium concentration range is about 10% of the total number of tree in the data set.
Figure 13D:
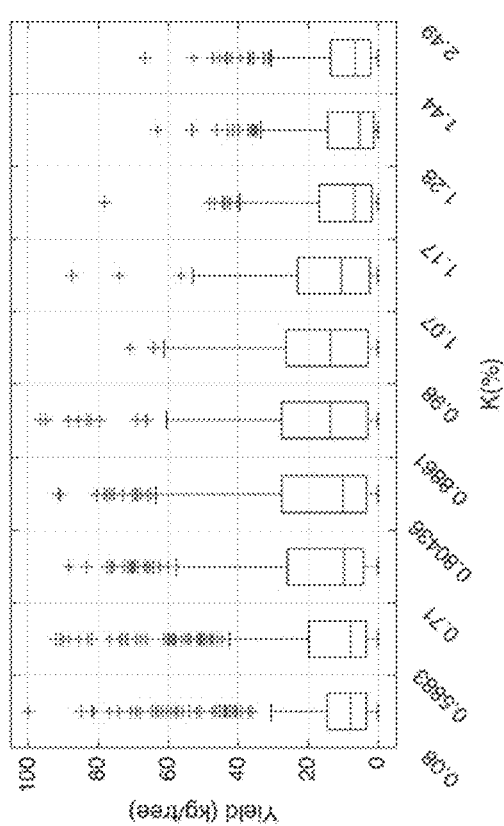
FIG. 13D illustrates the number of trees in each equally divided leaf potassium concentration range.

FIGS. 13A-13D illustrate analysis results on yield potentials with respect to leaf potassium (K) concentration levels. FIG. 13A illustrates yield potentials for trees with different leaf potassium concentration levels, where trees are binned based on their leaf potassium concentration levels at a step of about by 0.1% per bin. FIG. 13B illustrates yield potentials with respect to leaf potassium concentration levels for trees in the top 5% production category. FIG. 13C illustrates yield potentials for trees having leaf potassium concentration levels within different ranges, where the number of trees in each leaf potassium concentration range is about 10% of the total number of trees in the data set. FIG. 13D illustrates the number of trees in each equally divided leaf potassium concentration range. The analysis results show that approximately 20% of the trees in the population have leaf potassium concentration levels in the optimum range of about 0.8% determined using the optimization described above with respect to FIG. 2B. Approximately 20%° of the trees are low in leaf potassium concentration, and 60% of the trees have leaf potassium concentration levels that may be excessive for obtaining the maximum yield potential. Only 18% of the trees with leaf potassium concentration levels at about 0.8% are nonbearing, whereas 36% of the trees with leaf potassium concentration levels above 1.4% in the data set are low-yielding or non-bearing. This suggests that approximately 20% of trees in the industry are over-fertilized with potassium.

Figure 14A:
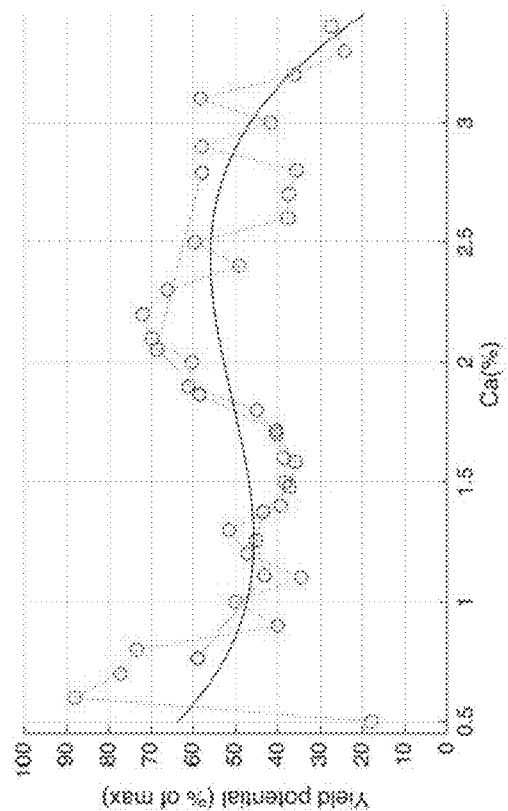
FIG. 14A illustrates yield potentials for trees with different leaf calcium concentration levels, where trees are binned based on their leaf calcium concentration levels at a step of about 0.1% per bin.
Figure 14B:
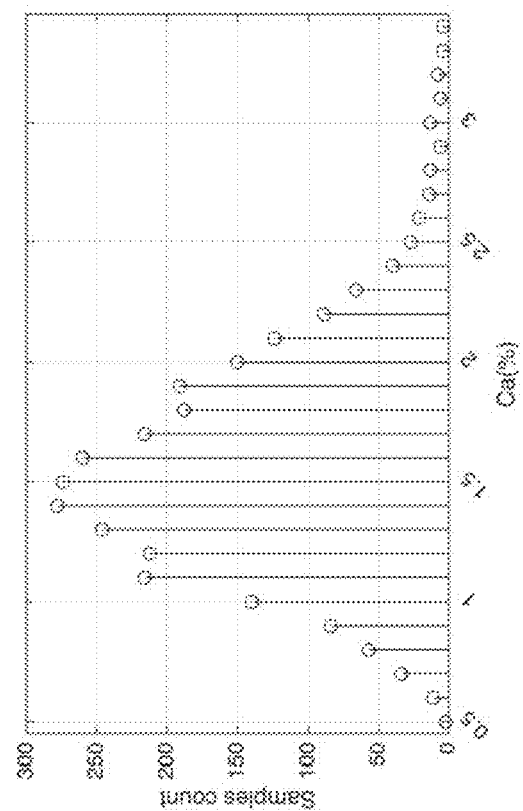
FIG. 14B illustrates yield potentials with respect to leaf calcium concentration levels for trees in the top 5% production category.
Figure 14C:
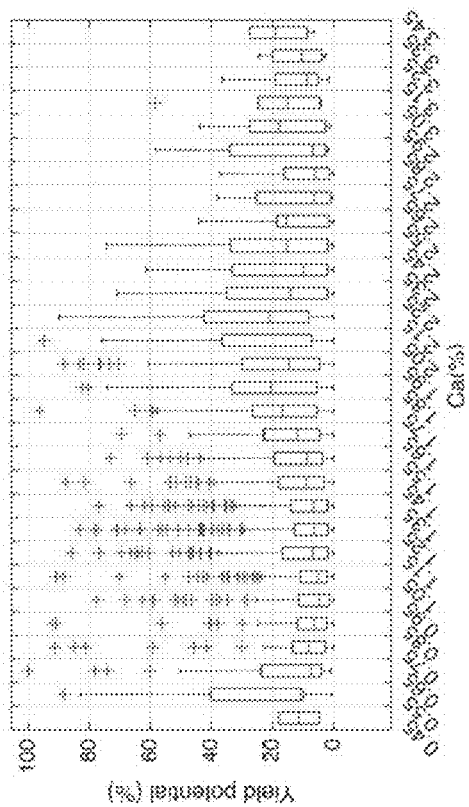
FIG. 14C illustrates yield potentials for trees having leaf calcium concentration levels within different ranges, where the number of trees in each leaf calcium concentration range is about 10% of the total number of tree in the data set.
Figure 14D:
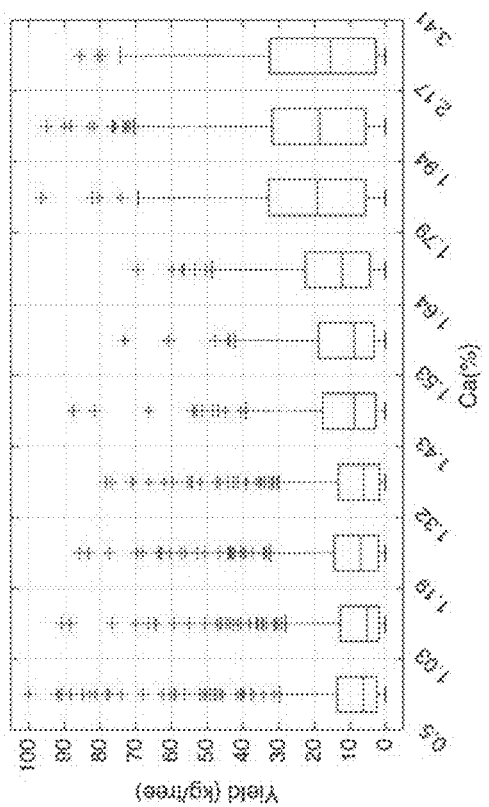
FIG. 14D illustrates the number of trees in each equally divided leaf calcium concentration range.

FIGS. 14A-14D illustrate analysis results on yield potentials with respect to leaf calcium (Ca) concentration levels. FIG. 14A illustrates yield potentials for trees with different leaf calcium concentration levels, where trees are binned based on their leaf calcium concentration levels at a step of about 0.1% per bin. FIG. 14B illustrates yield potentials with respect to leaf calcium concentration levels for trees in the top 5% production category. FIG. 14C illustrates yield potentials for trees having leaf calcium concentration levels within different ranges, where the number of trees in each leaf calcium concentration range is about 10% of the total number of tree in the data set. FIG. 14D illustrates the number of trees in each equally divided leaf calcium concentration range. The analysis results show that approximately 20% of the trees in the population have leaf calcium concentration levels in the optimum range of about 1.9- 2.2%, as determined using the optimization described above with respect to FIG. 5B. Approximately 70% of the trees are low in leaf calcium concentration, whereas 10% of the trees have calcium concentration levels that may be slightly excessive for obtaining the maximum yield potential. The analysis results indicate that the median fruit yield can be doubled by increasing calcium fertilization. This could be achieved by increased use of gypsum, or using a sulfur burner to produce gypsum by reaction with in situ lime.

FIGS. 15A-15D illustrate analysis results on yield potentials with respect to leaf magnesium (Mg) concentration levels. FIG. 15A illustrates yield potentials for trees with different leaf magnesium concentration levels, where trees are binned based on their leaf magnesium concentration levels at a step of about by 0.05% per bin. FIG. 15B illustrates yield potentials with respect to leaf magnesium concentration levels for trees in the top 5% production category. FIG. 15C illustrates yield potentials for trees having leaf magnesium concentration levels within different ranges, where the number of trees in each leaf magnesium concentration range is about 10% of the total number of tree in the data set. FIG. 15D illustrates the number of trees in each equally divided leaf magnesium concentration range. The analysis results show that approximately 30% of the trees in the population have leaf magnesium concentration levels in the optimum range of about 0.6-0.68% as determined using the optimization described above with respect to FIG. 5B. Approximately 60% of the trees are low in leaf magnesium concentration, whereas 10% of the trees have leaf magnesium concentration levels that may be slightly excessive for obtaining the maximum yield potential. At leaf magnesium concentration levels of about 0.4-0.48% (representing about 20% of the population in the data set), about 35% of the trees were non-bearing, and the proportion of high-producing trees decreases to near zero. When the leaf magnesium concentration level is increased to the target range of about 0.6-0.68%, the number of non-bearing trees may be reduced to about 18% and the proportion of high-yielding trees may be increased to approximately 22% of the population. The analysis results indicate that the median fruit yield could be doubled by increasing dolomitic lime fertilization of trees having low Mg levels.

Figure 16A:
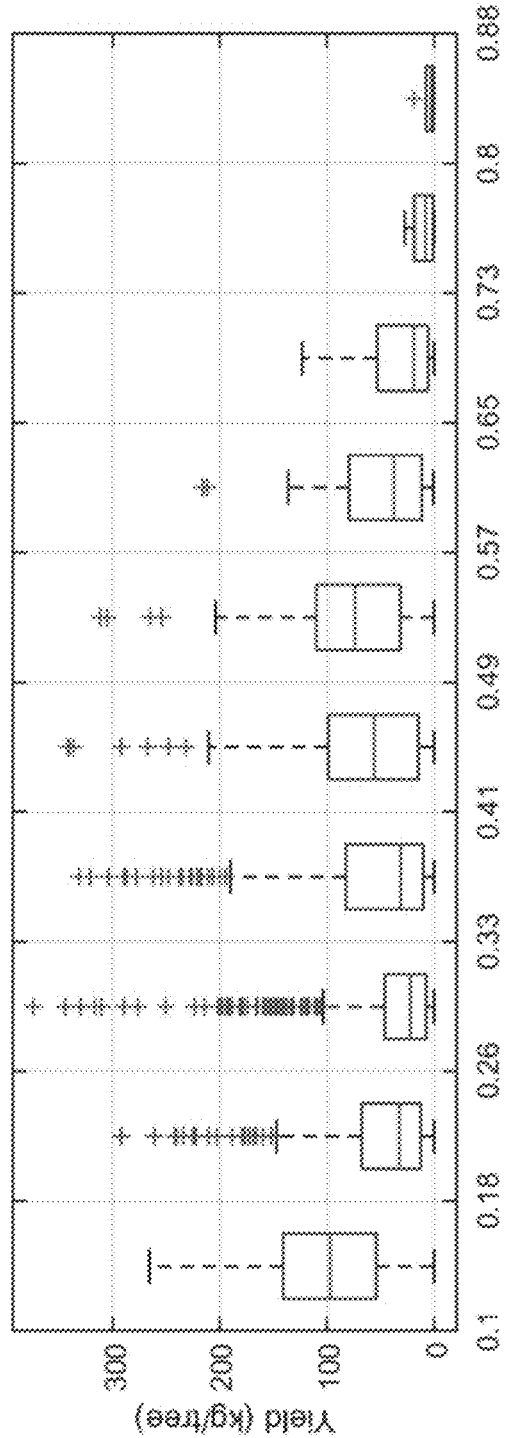
FIG. 16A illustrates yield potentials for trees with different leaf sulfur concentration levels, where trees are binned based on their leaf sulfur concentration levels at a step of about 0.08% per bin.
Figure 16B:
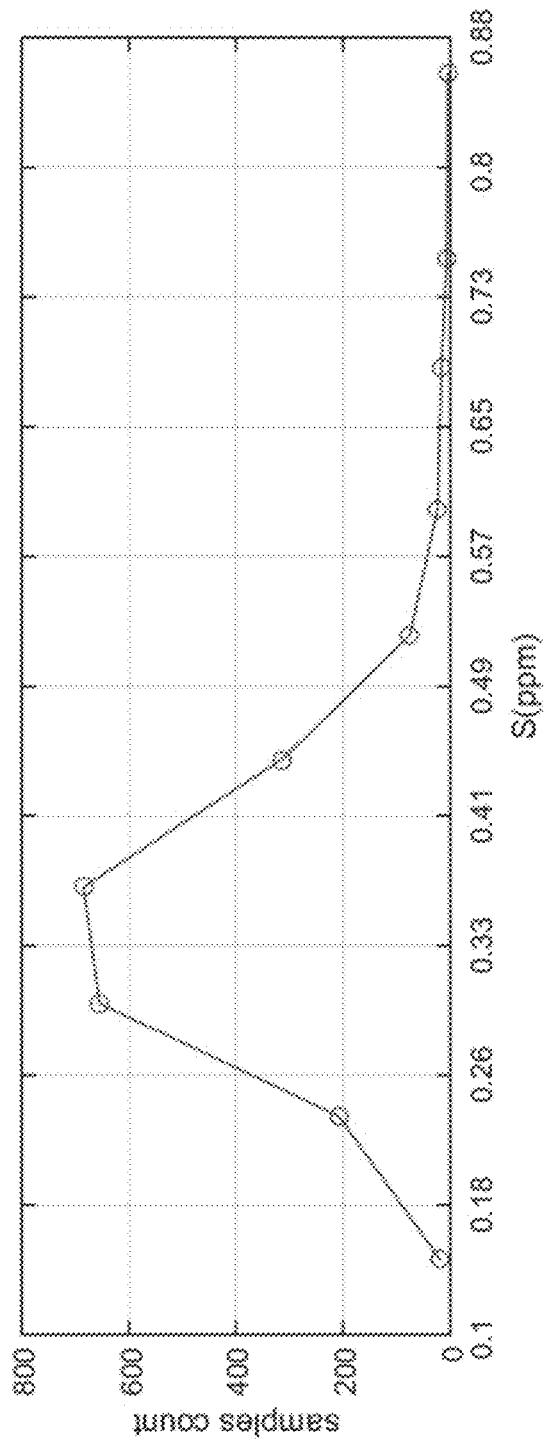
FIG. 16B illustrates the number of trees in each equally divided leaf sulfur concentration range.

FIG. 16A illustrates yield potentials for trees with different leaf sulfur concentration levels, where trees are binned based on their leaf sulfur concentration levels at a step of about 0.08% per bin. FIG. 16B illustrates the number of trees in each equally divided leaf sulfur concentration range. FIG. 16A shows that the maximum yield occurs when the leaf sulfur concentration level is at about 0.49 to 0.57%. However, FIG. 16B shows that most trees in the data set have leaf sulfur concentration levels between about 0.26% and about 0.41%, with a mean value at 0.33%. At this leaf sulfur concentration range, trees may produce approximately 20-30 kg of fruit per tree. Median yields of trees with leaf sulfur concentration at the optimal or preferable level of about 0.5% may be more than doubled.

B. Nutrient-Yield Models Based on Quantile Regression Analysis

For each yield category, the nutrient response curve of potential yield as a function of each nutrient element may be derived based on the yield and leaf nutrient concentration data as shown in the figures above, using, for example, polynomial regression analysis to achieve a best fit of the quantile regression modeling data.

FIG. 17 illustrates example polynomial equations that provide best fits for data from the top 5% best performing trees for various nutrient elements, such as nitrogen, phosphorus, potassium, and chloride. In the polynomial equations shown in FIG. 17, the yields are expressed as the percentage of yield potentials rather than actual fruit yield in kg. In the polynomial equations in FIG. 17, Polyn represents a polynomial of nth degree; Y (kg/tree) is the maximum obtainable yield or maximum yield potential; pn is the estimated coefficient of the nth terms of the polynomial; x is the nutrient concentration; R-square is the coefficient of determination, a statistical parameter indicating how close the data are to the fitted regression line; SSE is the sum of squared errors; and RMSE is the root mean squared error.

Polynomial equations describing the potential yield as a function of each nutrient element can be similarly derived for other productivity categories using data associated with trees in each of the productivity categories. The analysis results show that trees in the productivity category having yields closer to the median tree also show the same response curves as the top 5% best performing trees, but have lower fruit productions due to other environmental constraints that limit their potential production other than nutritional conditions. The equations may be used to determine the optimum concentration of various nutrient elements and the predicted potential yield for a particular tree or group of trees, as described above with respect to FIG. 1.

C. Artificial Neural Network Analysis

In some embodiments, artificial neural network (ANN) models may be used for curve fitting to derive the relationship between the potential yield and each nutrient element. Because independent ANN models may be seeded with random numbers to initiate the pattern recognition process, every model may generate a different solution. Several models may be run to determine whether the ANN software is able to derive consistent patterns from the data set. In one example, 10 separate models are run to examine the effects of nitrogen on avocado yields. Data from the 10 runs are then analyzed to generate mean values and standard deviations that provide both a final summary equation and an estimate of the error associated with independently run models.

Figure 18A:
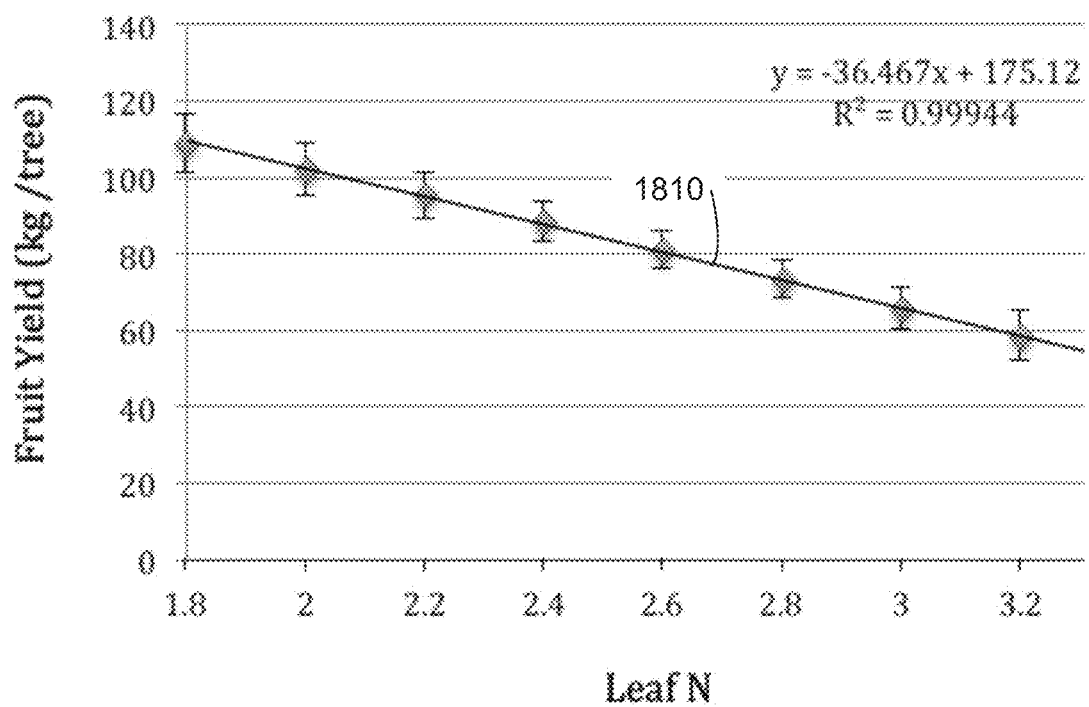
FIG. 18A illustrates a statistical analysis of ten independent ANN model runs for predicting effects of leaf N concentration levels on avocado fruit yields.
Figure 18B:
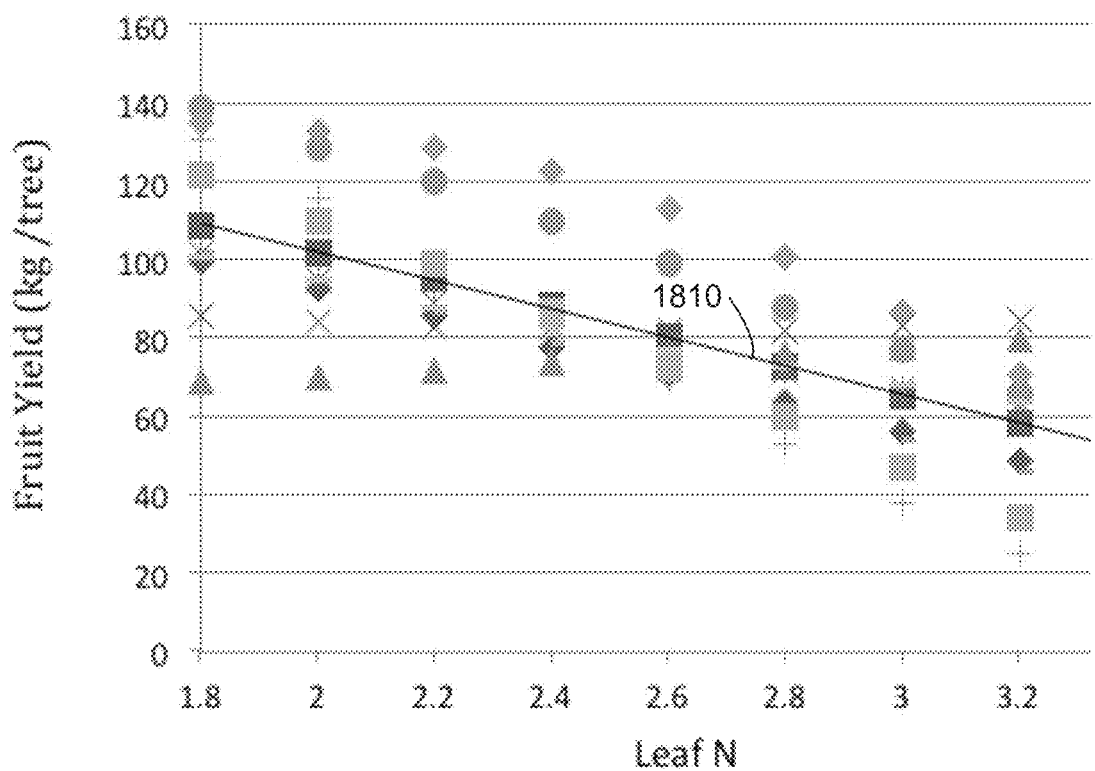
FIG. 18B illustrates the variability in model runs for prediction of fruit yields from leaf N concentration levels on avocado fruit yields.

FIG. 18A illustrates a statistical analysis often independent ANN model runs for predicting effects of leaf N concentration levels on avocado fruit yields. A line 1810 shows the mean value for all ten runs. FIG. 18B illustrates the variability in model runs for prediction of fruit yields from leaf N concentration levels on avocado fruit yields. The results shown in FIGS. 18A and 18B demonstrate that while there are variations among independent ANN models, the models may converge to consistently show a reduction in avocado yields with an increase in leaf nitrogen concentration level. Using the data from the 10 separate model runs, an equation may be generated to predict the effects of leaf N concentration levels on avocado yields with high confidence.

Figure 19:
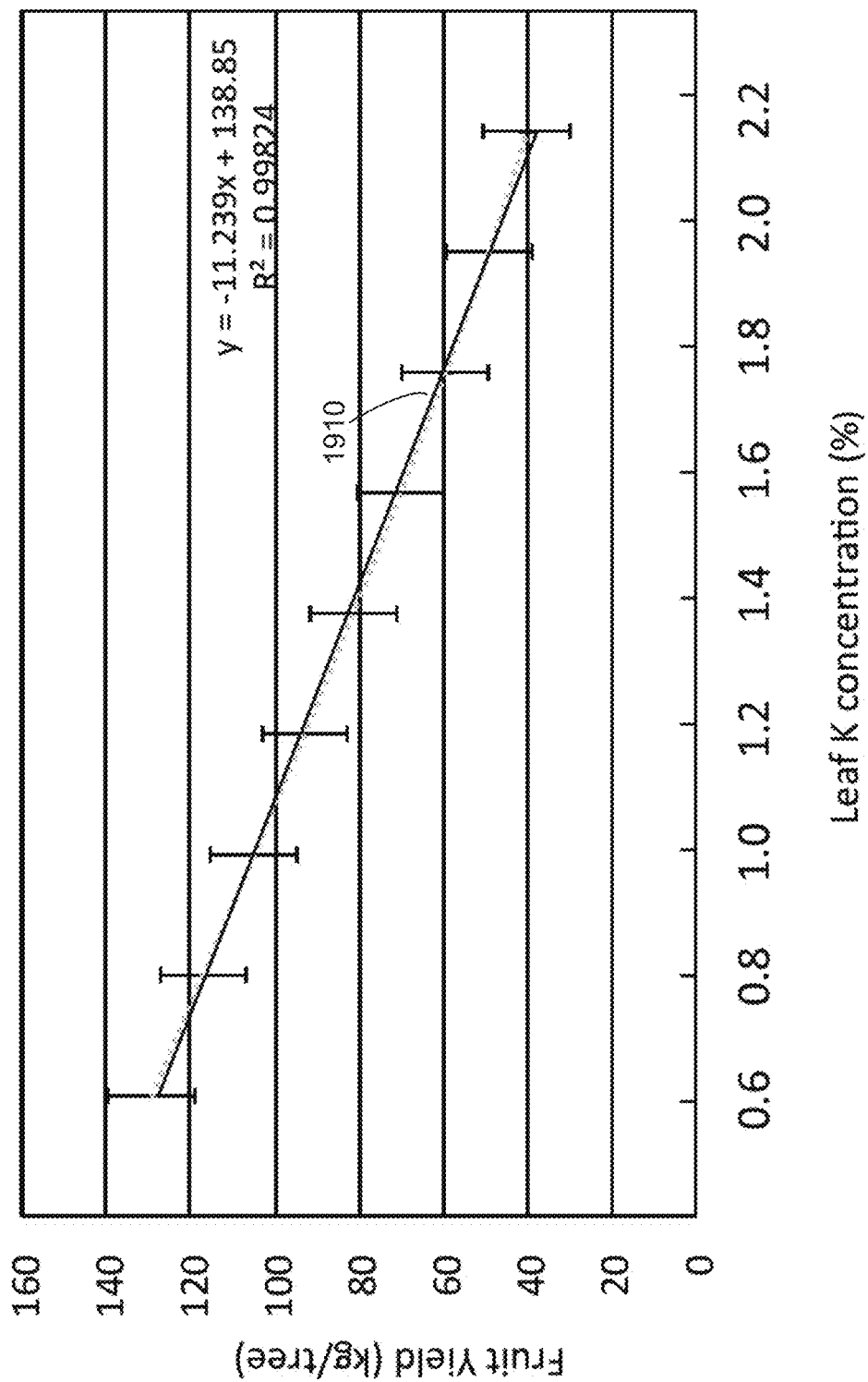
FIG. 19 illustrates a statistical analysis of ten independent ANN model runs for predicting effects of leaf K concentration levels on avocado fruit yields.

FIG. 19 illustrates a statistical analysis often independent ANN model runs for predicting effects of leaf K concentration levels on avocado fruit yields. A line 1910 shows the mean value for all ten runs. The ANN model predictions for the effects of leaf potassium concentration levels on avocado fruit yields shows that, like nitrogen, excess amounts of potassium supplied to the avocado plants may result in a yield reduction.

The ANN results may be cross-validated with the quantile regression analysis results. As described above, models that focuses on expected values, such as least squares linear regression (LSR), are generally based on strong assumptions about the distribution of the data, such as normally distributed residuals and homogeneous variance, or homoscedasticity of the system. However, these assumptions may be invalid for commercial avocado orchards because the observed data samples are generally not normally distributed and are not homoscedastic. The quantile regression technique based on quantile sampling may not depend on such assumptions, and thus may be able to provide more accurate modeling.

To cross-validate the ANN results shown in, for example FIGS. 18A, 18B, and 19, the domain of X may be divided into n segments (or bin categories) S of equal lengths in such a way that the union of the collection of disjoint segments s1, s2, . . . , sn∈S is the entire range X. In certain cases, depending on the available data, the range of X may be trimmed in order to exclude outliers of the covariate on the horizontal axis of the graphic plot. Next, data-points pertaining to each bin category may be aggregated using conditional quantile sampling functions $q\tau(sj)$ defined for sj, where j=1, 2, . . . , n. For example, the conditional quantile sampling functions may be used to sample plants having yields within a certain percentile range among all the plants, such as every 10%, every 20%, or every 25%. The values of the aggregated samples may then be summarized for each of the different quantiles. For example, the upper 10% quantile for each bin category may be sampled and a measure of central tendency may be used to summarize the upper quantile. For each quantile, a single value for each bin category may be obtained. The union of these points may form a data envelope, which may be referred to as "boundary line" or "frontier of production."

Figure 20A:
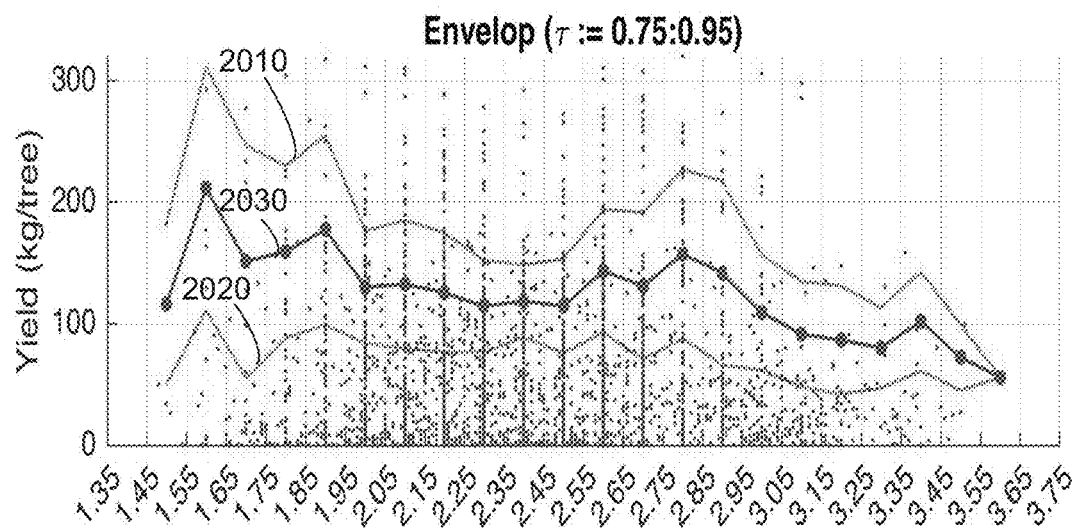
FIG. 20A illustrates example boundary line analysis results for avocado yields as a function of leaf N concentration levels.

FIG. 20A illustrates example boundary line analysis results for avocado yields as a function of leaf N concentration levels. In FIG. 20A, each dot may indicate the yield of a tree. Trees with the highest yield potential (95% quantile) may be indicated by data points in the upper line 2010. Trees with the top 75% highest yield potential (75% quantile) may be indicated by data points in line 2020. Line 2030, which is the average of line 2010 and line 2020, may represent the boundary line or the frontier of production. Boundary line 2030 shows that fruit yields for these trees may be approximately 200 kg per tree at a leaf N concentration level of 1.6%, and decline to 150 kg at a leaf N concentration level of 2.0%. A second peak at a leaf N concentration level of 2.8% is associated with yields of about 180 kg per tree, after which the yield potential progressively declines to about 50 kg per tree for trees having a leaf N concentration level of 3.5%.

Figure 20B:
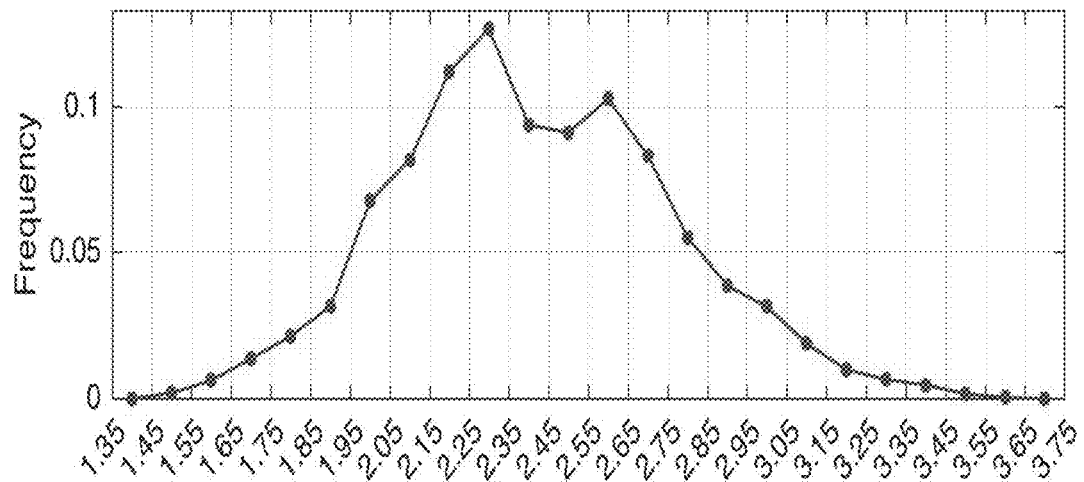
FIG. 20B is a frequency chart illustrating the distribution of individual trees having different levels of leaf nitrogen concentration.

FIG. 20B is a frequency chart illustrating the distribution of individual trees having different levels of leaf nitrogen concentration. The frequency chart shows that most trees across the industry are fertilized to a leaf N concentration level of 2.3%, at which level the trees may have a yield potential of 120 kg per tree.

Figure 20C:
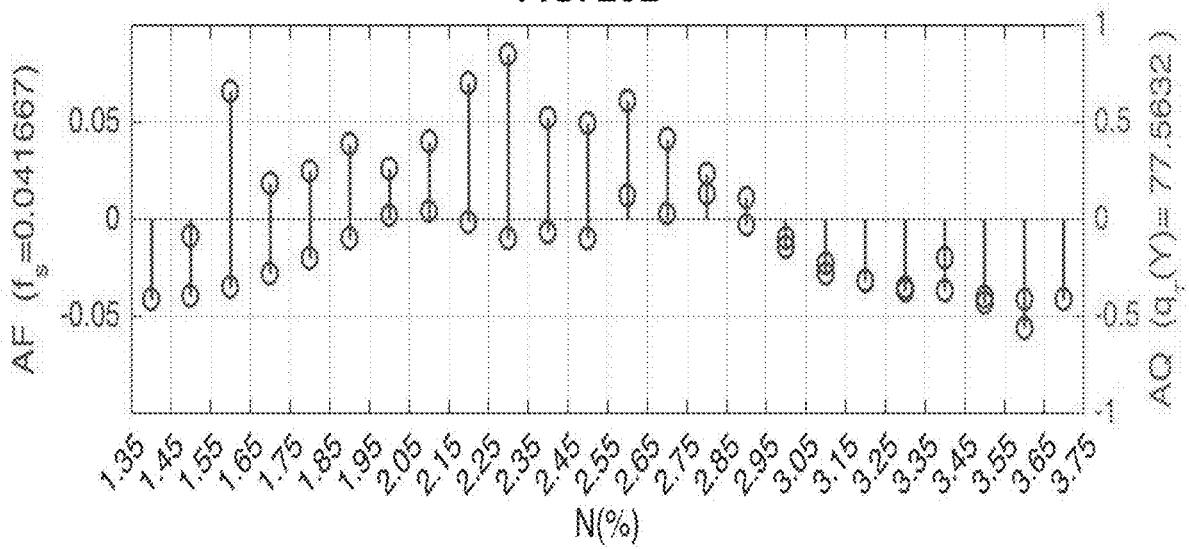
FIG. 20C illustrates the differences (anomalies) between the boundary line and a reference value (e.g., an mean or median value of the boundary line), and the anomalies of tree distribution for different levels of leaf nitrogen concentration.

FIG. 20C illustrates the differences (anomalies) between the boundary line and a reference value (e.g., an mean or median value of the boundary line), and the anomalies (non-uniformity) of tree distribution for different levels of leaf nitrogen concentration.

Figure 21A:
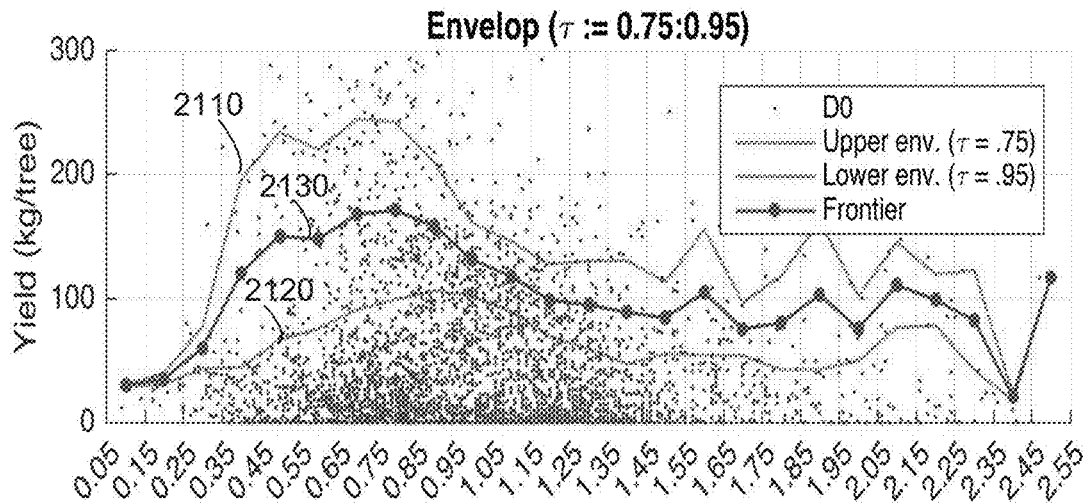
FIG. 21A illustrates example boundary line analysis results for avocado yields as a function of leaf potassium concentration levels.

FIG. 21A illustrates example boundary line analysis results for avocado yields as a function of leaf K concentration levels. In FIG. 21A, each dot may indicate the yield of a tree. Trees with the highest yield potential (95% quantile) may be indicated by data points in the upper line 2110. Trees with the top 75% highest yield potential (75% quantile) may be indicated by data points in line 2120. Line 2130, which is the average of line 2110 and line 2120, may represent the boundary line or the frontier of production. Boundary line 2130 shows that the yield potential is near maximum when the leaves contain ~0.8% K. Trees at this leaf K concentration level may have a yield about 180 kg per tree. At a leaf K concentration level of about 1.5%, the yield potential is reduced to about 100 kg per tree.

Figure 21B:
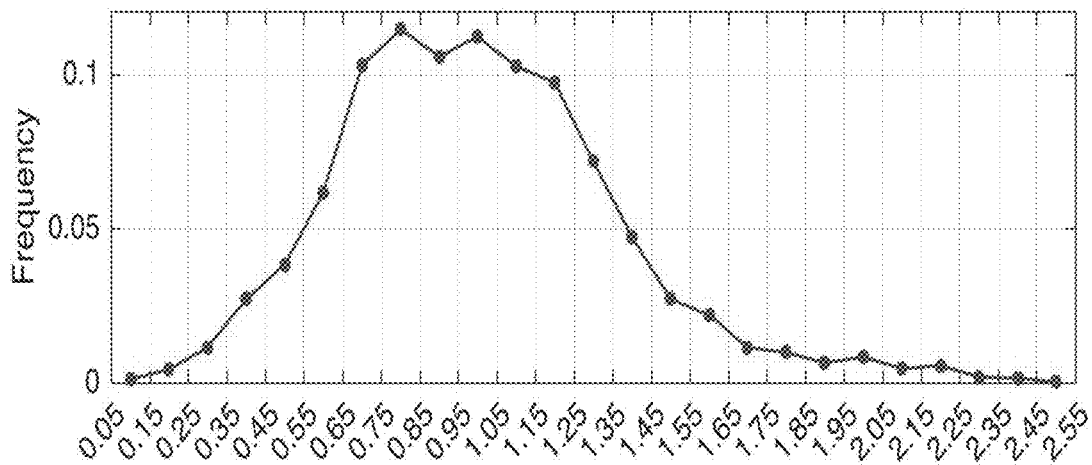
FIG. 21B is a frequency chart illustrating the distribution of individual trees having different levels of leaf potassium concentration.

FIG. 21B is a frequency chart illustrating the distribution of individual trees having different levels of leaf potassium concentration. FIG. 21B shows that more than half of the trees included in the study have a leaf potassium concentration level above the optimum level of 0.8%.

Figure 21C:
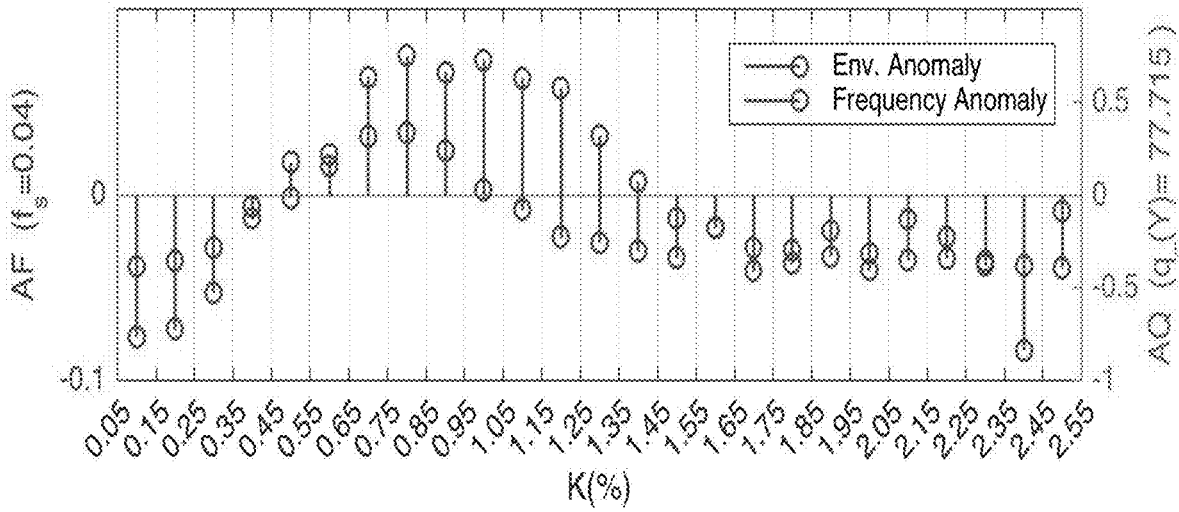
FIG. 21C illustrates the differences (anomalies) between the boundary line and a reference value (e.g., an mean or median value of the boundary line), and the anomalies of tree distribution for different levels of leaf potassium concentration.

FIG. 21C illustrates the differences (anomalies) between the boundary line and a reference value (e.g., an mean or median value of the boundary line), and the anomalies (non-uniformity) of tree distribution for different levels of leaf potassium concentration.

Thus, the quantile regression analysis results confirm that excess nitrogen and potassium levels in the leaf tissue may be associated with greatly reduced yield potential, which may reflect a shift from reproductive to vegetative growth. The loss in yield potential occurs at leaf N concentration levels above 2.8%, and leaf potassium concentration levels above 0.8%. Further losses in yield potential may occur at the rate of about 10% for each additional 0.1% of N or K above their optimal values. Greater than 50% loss in yield potentials may occur at a leaf N concentration level of 3.4% or a leaf K concentration level of 1.5%.

In some implementations, ANN modeling may also provide insight into the systemic, complex nature of the trees generating the data and the correlations between various nutrient elements and the tree yields. For example, in some embodiments, ANN modeling techniques, for example, self-organizing maps (SOMs), such as Kohonen SOMs (KSOMs), may be used to provide a color-coded representation of the correlations between tree yields and concentration levels of multiple nutrient elements. In some implementations, the ANN modeling may use filters to remove nonproductive or low-producing (e.g., less than 10 kg) trees, and examine nutrient effects and interactions with respect to the better performing trees.

KSOMs can be used to visualize data by reducing the dimensions of the data through the use of self-organizing neural networks in unsupervised learning. SOMs are different from other artificial neural networks in that they apply competitive learnings rather than error-correction learnings, and use a neighborhood function to preserve the topological properties of the input space. SOMs generally produce a map of one or two dimensions, which plots the similarity of data by grouping similar data items together. In other words, SOMs both reduce dimensions and identify similarities. KSOMs may be displayed using a hexagonal grid (or unified distance matrix), where each hexagon represents a node (neuron) in the neural network.

Figure 22:
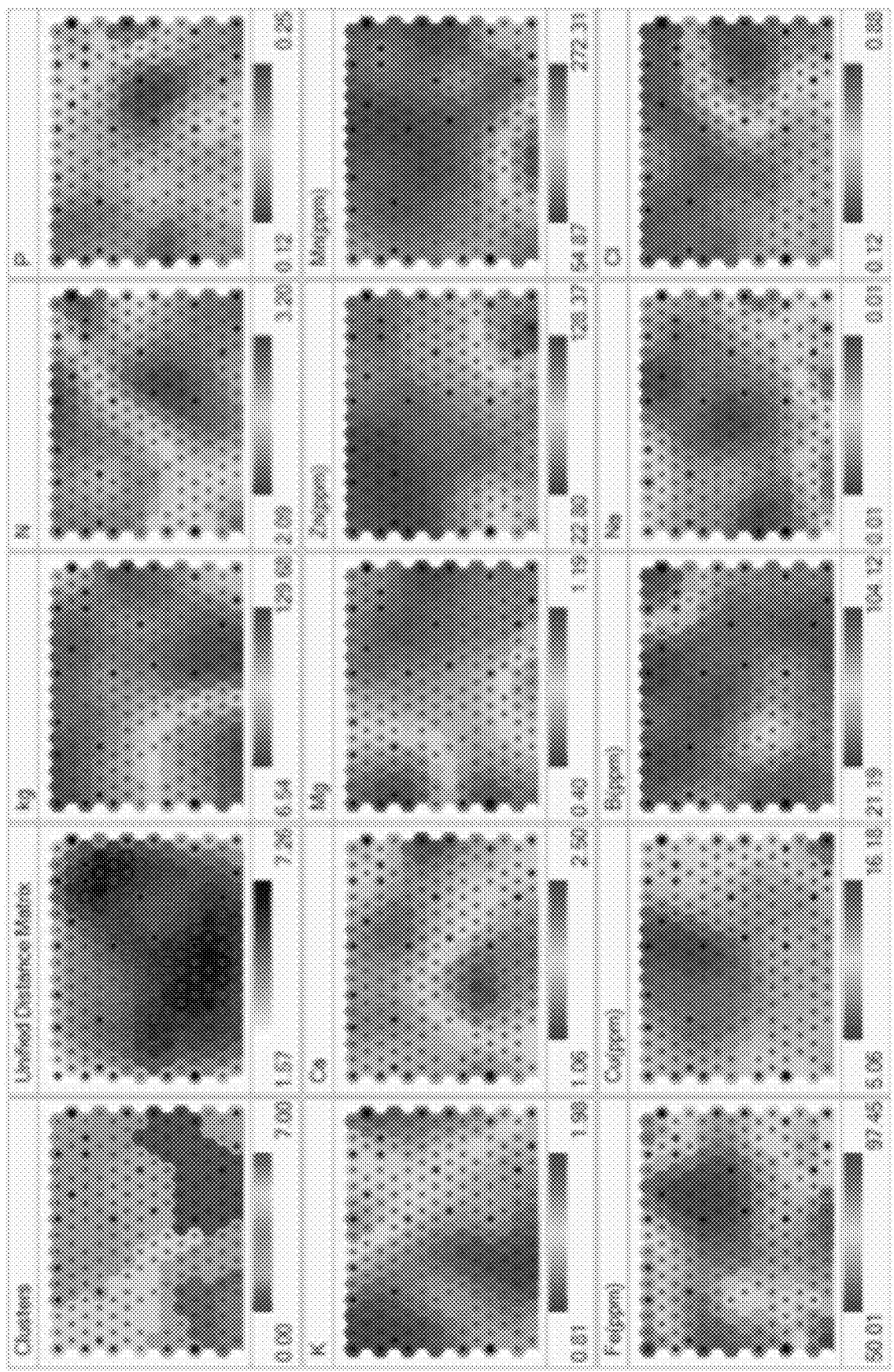
FIG. 22 illustrates example Kohonen self-organizing maps (KSOMs) representing correlations between concentration levels of various nutrient elements and tree yields.

FIG. 22 illustrates KSOMs representing correlations between concentration levels of various nutrient elements and tree yields. In FIG. 22, the first panel from the left in the top row shows the clustering of sets of trees in such a way that trees in the same group (i.e., cluster) are more similar in certain aspects to each other than to those in other groups (clusters). The second panel from the left in the top row shows the distances between the neighboring neurons, where a dark color between the neurons corresponds to a large distance and thus a gap between the values in the input space (which may represent the boundaries of clusters), while a light color between the neurons signifies that the values are close to each other in the input space. Yields in kg are shown in the third panel from the left in the top row and are color-coded from about 6.5 kg/tree (blue) to about 129 kg/tree (red). All trees having high yields are organized and displayed in the lower left corner. The other panels show the nutrient concentration levels of the trees for various nutrient elements, such as nitrogen (N), phosphorus (P), potassium (K), calcium (Ca), magnesium (Mg), Zinc (Zn), manganese (Mn), iron (Fe), copper (Cu), boron (B), sodium (Na), and chloride (CI), in percent or ppm. By comparing the third panel and the panels showing nutrient concentration levels, the levels of nutrient concentration that are associated with the highest yields may be identified.

Figure 23:
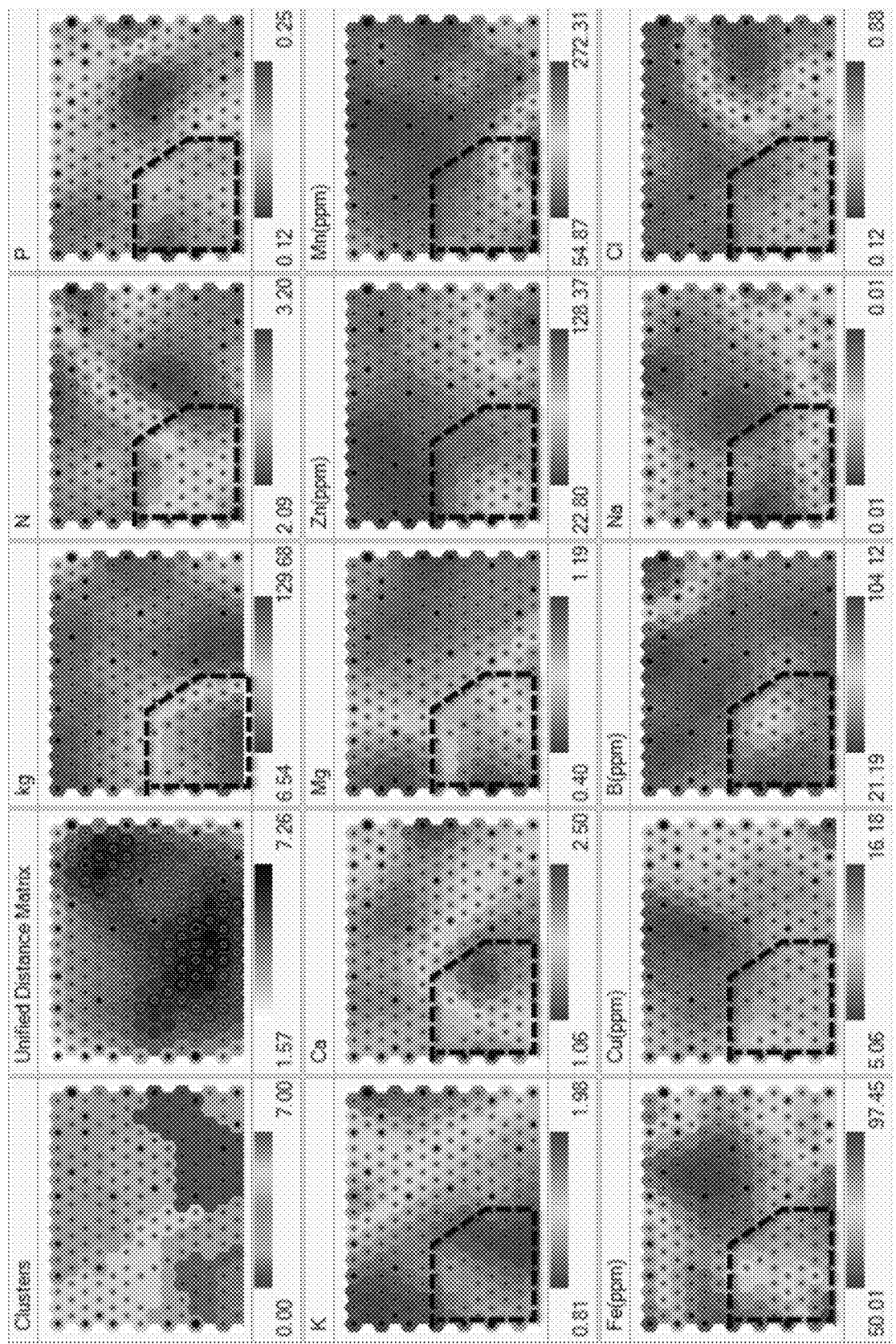
FIG. 23 illustrates the same KSOMs as in FIG. 18 with relevant areas of the panels associated with high yields identified.

FIG. 23 illustrates the same KSOMs as in FIG. 22 with relevant areas of the panels associated with high yields identified. FIG. 23 shows that trees with high yields are clustered in the lower left corner of the panels, which corresponds to intermediate concentration levels of N, and that high concentration levels of N at or greater than about 3% are associated with trees having low yields (blue-colored areas in the kg panel). FIG. 23 also shows that the high yield area corresponds to intermediate concentration levels of P, low to intermediate concentration levels of K, and high concentration levels of Ca.

Figure 24:
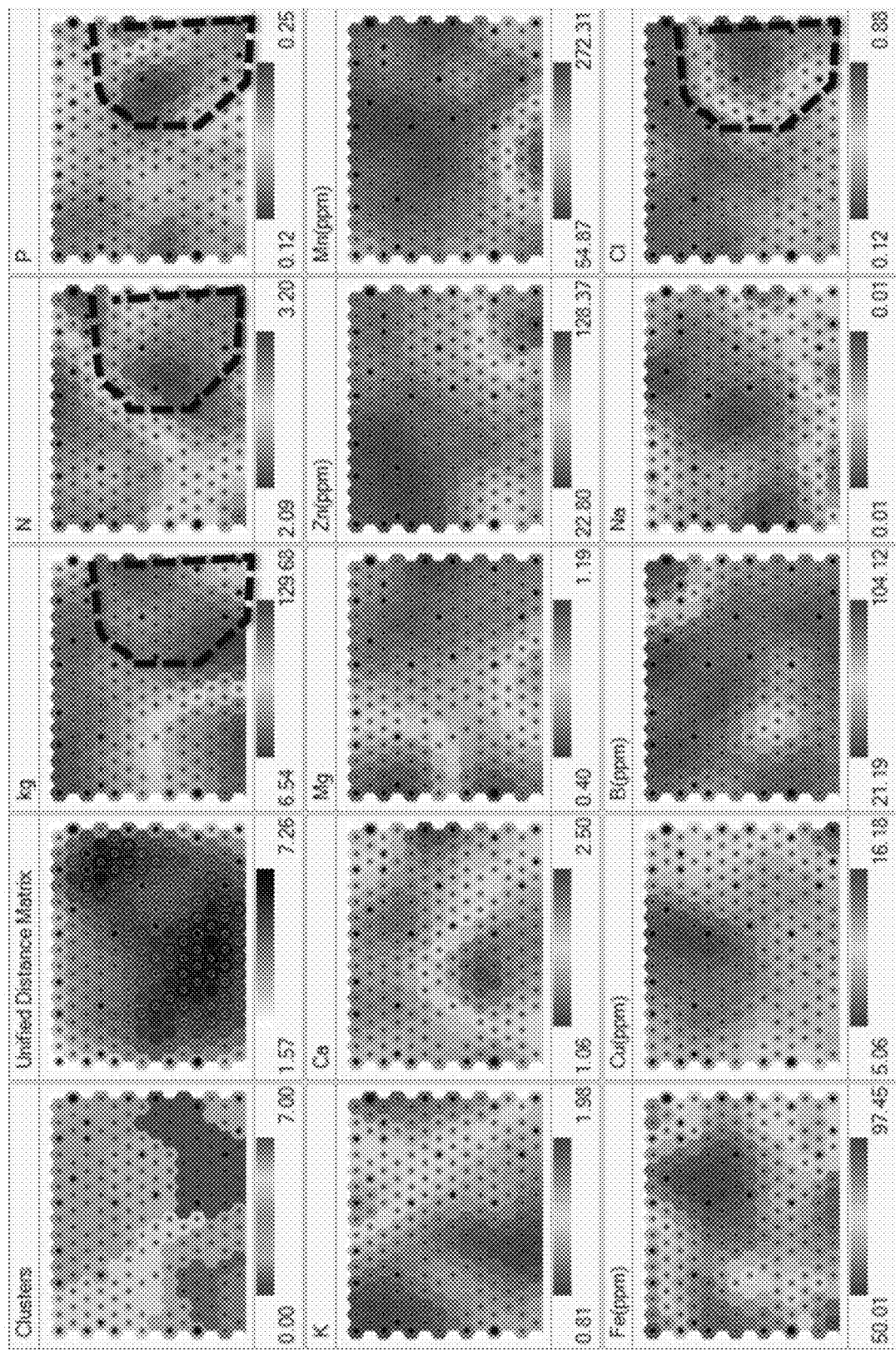
FIG. 24 illustrates the same KSOMs as in FIG. 18 with relevant areas of the panels associated with high leaf chloride concentration levels identified.

FIG. 24 illustrates the same KSOMs as in FIG. 22 with relevant areas of the panels associated with high leaf chloride concentration levels identified. FIG. 24 may be used to examine the relationships between yields and leaf chloride concentration levels and concentration levels of other nutrient elements. FIG. 24 indicates that high leaf chloride levels are generally associated with lower concentration levels of nitrogen and phosphorus. This may be caused by chloride toxicity effects on root growth and the amount of root surface area and root length that can take nutrients from the soil or water. FIG. 24 also indicates that high concentration levels of calcium are generally associated with lower chloride concentration levels, while high concentration levels of leaf chloride seldom occur in trees with high leaf nitrogen concentration levels. In this manner, the KSOMs may provide an efficient method for quickly examining nutrient-yield relationships that may be examined in more detail using various other statistical methods.

Figure 25:
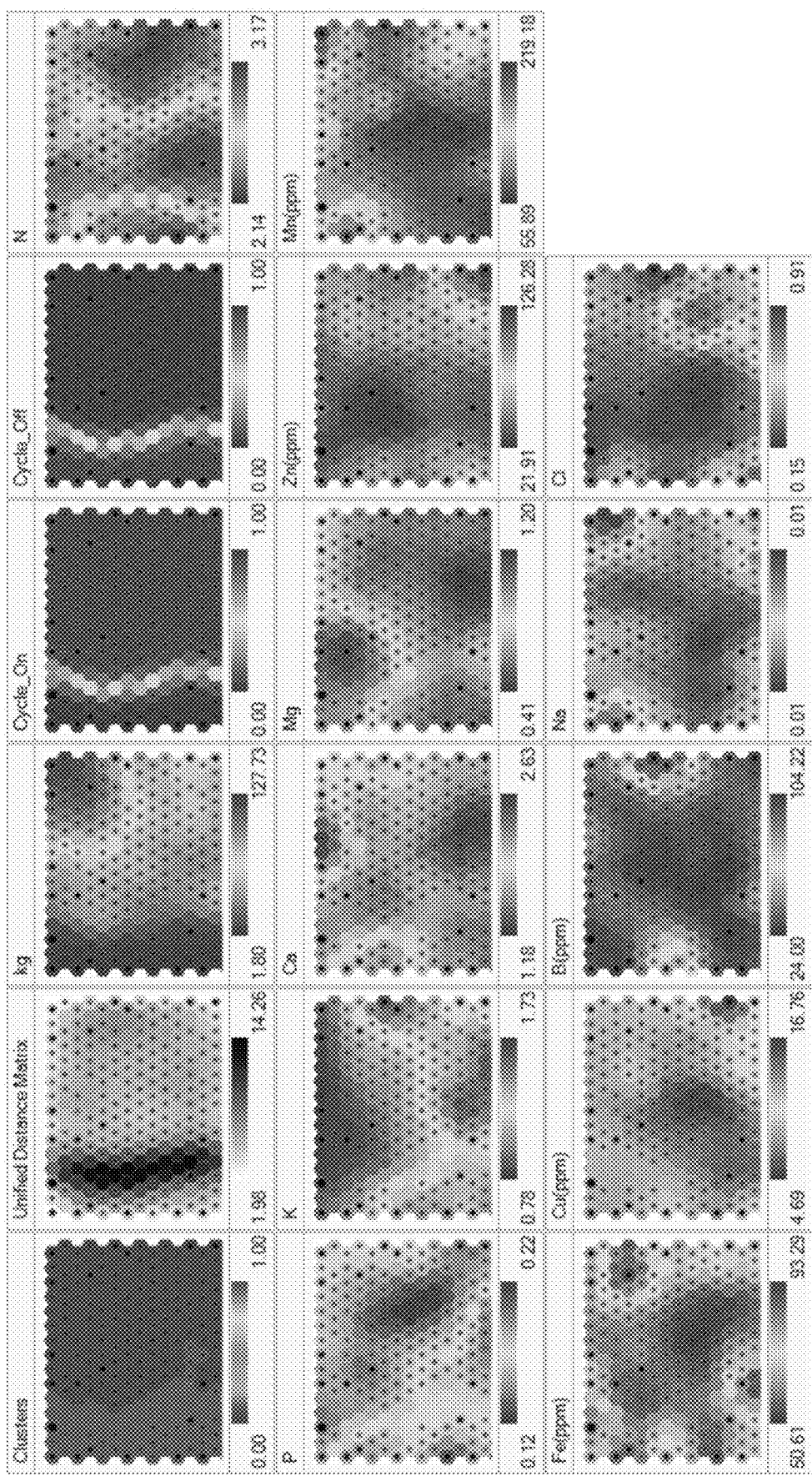
FIG. 25 illustrates KSOMs representing correlations between concentration levels of various nutrient elements and tree yields including ON/OFF cycle status.

FIG. 25 illustrates KSOMs representing correlations between concentration levels of various nutrient elements and tree yields including ON/OFF cycle status. By including the ON/OFF cycle status into the analysis, two new panels, one for trees in ON cycle and one for trees in OFF cycle, may be added as shown in FIG. 25. Trees in OFF cycle are represented by the blue section of the fourth panel from left in the top row or the red section of the fifth panel from left in the top row, which is confirmed as being associated with low yields in the kg panel. FIG. 25 indicates that trees in the OFF cycle are generally associated with trees having both low N concentration levels and high P concentration levels. Data in the panels may also indicate that trees are more prone to be in the OFF cycle when they have low K concentration levels together with high Ca and N concentration levels. Based on these indications, it may be concluded that nutrient imbalances may push trees into vegetative growth as opposed to reproductive growth.

Note that, in FIG. 25, the independently generated KSOMs are consistent with the KSOMs of FIGS. 22-24 regarding the nutrient concentration levels that are associated with high yields. As in FIGS. 22-24, the highest yields are clustered in a (top right) corner of each panel, which corresponds to intermediate P concentration levels, low to intermediate K concentration levels, high Ca concentration levels, low to medium Mg concentration levels, and high iron (Fe) and sodium (Na) concentration levels. Trees with high Cl concentration levels have low yields or are in OFF cycle, which indicates that high Cl concentration levels in combination with high N concentration levels may push trees into vegetative growth rather than reproductive growth.

The above examples illustrate the analysis of nutrient data and generation of models that describe the effects of nutrients on yields of trees in different productivity categories. Techniques such as ANN modeling and advanced production analysis using quantile regression may be used. Thus, the yields of fruit-bearing trees may be improved. As described above, the nutrient-yield functions for different productivity categories may be used to cross-checked the determined optimum nutrient concentration levels, to determine whether certain nutrient concentration levels can result in improved yields for tress in other productivity categories, or to refine the optimum nutrient concentration levels such that they may work for trees in different productivity categories.

Figure 26:
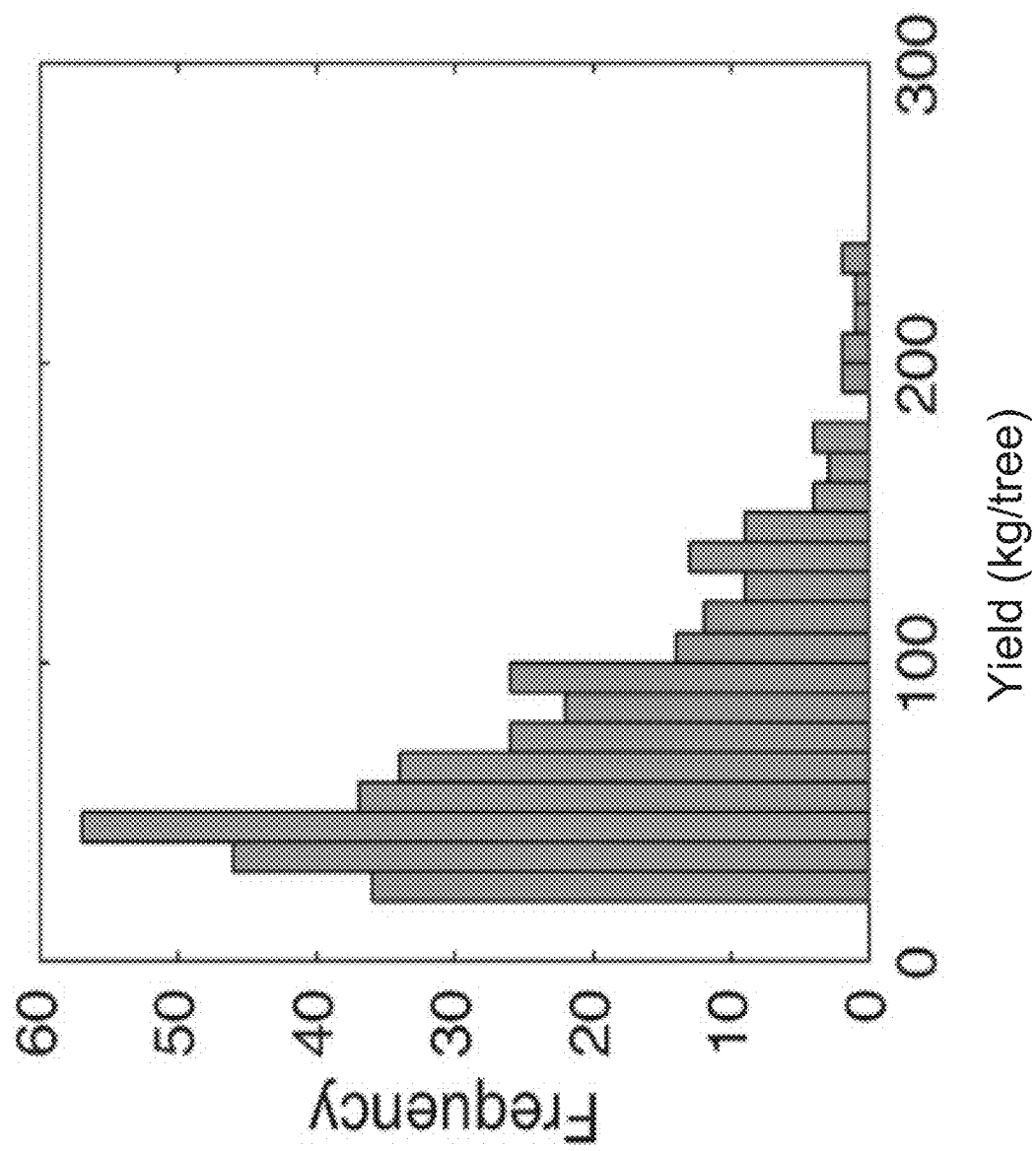
FIG. 26 illustrates example distribution of trees in various yield categories.

The above examples also show that it is possible to analyze how tree nutritional conditions may affect the distribution of low, medium, and high productivity trees in the orchard using techniques disclosed herein. An example distribution of the number trees in each yield category is illustrated in FIG. 26. For example, in any given year, about 10 to 30% of trees in an orchard may be in a pronounced non-bearing state or produce less than 10 kg of fruit per tree, and may be deemed to be in OFF cycle. These trees may be nonresponsive to nutritional conditions, and thus data associated with these nonproducing trees may be considered as noise in the data set and be filtered out in order to determine the nutrient-yield relationships for trees that are in the ON cycle. It may thus be important to consider how tree nutritional conditions may affect the overall numbers of trees that are in ON or OFF cycle in their reproductive growth or vegetative growth. Analysis results described above show that tree nutritional conditions appear to affect the distribution of productive and nonproductive trees, with fewer numbers of nonproductive trees at specific nutrient concentration levels for each nutrient element. By considering how nutritional condition affects both tree productivity and the number of fruit-bearing trees, the yield responses to deficiencies or excesses of individual elements for an orchard can be numerically modeled.

The above analysis examples also indicate that different productivity categories may have the same optimum nutrient concentration levels. In other words, trees that are highly productive, e.g., yielding over about 100 kg or 200 kg of fruit per tree, may have the same optimum nutrient concentration levels as median trees normally producing, for example, about 40 kg of fruit per tree. The analysis results show that the overall yield response patterns with respect to leaf nutrient concentration levels are similar for median and highly productive trees, and thus a common nutritional condition may improve yields for the trees have the highest yield potentials and tress having medium yield potentials. However, when data for trees with low productivities is considered, a narrower range of target nutritional condition may be needed to both improve the productivity per productive tree and increase the number of productive trees.

Techniques disclosed above may provide further information for economic modeling and profitability optimization. For example, once the costs of different fertilizer strategies are determined, the cost data may be entered into the generated nutrient-yield models to determine the cost-benefit of adjusting the tree nutrient condition to specific conditions corresponding to higher yield potentials, for example, higher calcium, sulfur, or magnesium concentration levels, while avoiding excessive N, P, and K applications, which may correspond to lower yields and higher numbers of nonbearing trees.

It is noted that there may be a relationship between plant nutrient concentration levels and yields in the previous year due to nutrient carry-off with the fruit harvest, and a relationship between nutrient concentration levels and yields in the next year. In other words, plant nutrient concentration levels may indicate the nutrient depletion that has occurred due to the prior year's harvest (descriptor) an/or whether there are sufficient stored nutrients for the next year's crop (predictor).

Figures 27A, 27B:
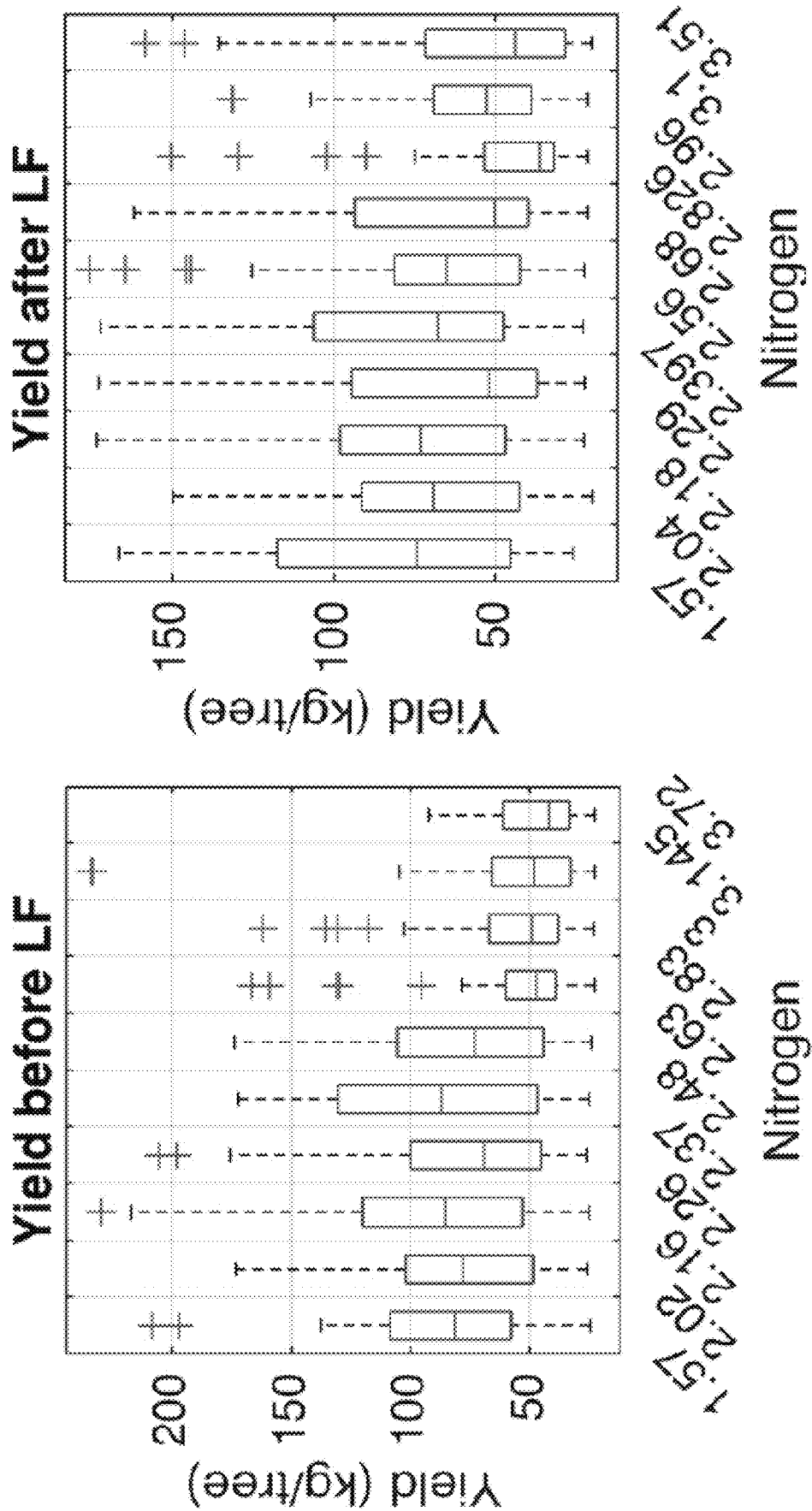
FIG. 27A illustrates example ranges in yields before leaf samples were taken for trees with different leaf nitrogen concentration levels.
FIG. 27B illustrates the range in yields after leaf samples were taken for trees with different leaf nitrogen concentration levels.

FIG. 27A illustrates example ranges in yields before leaf samples were taken for trees with different leaf nitrogen concentration levels. FIG. 27B illustrates example ranges in yields after leaf samples were taken for trees with different leaf nitrogen concentration levels. As shown in FIG. 27A, high yields can be achieved when the leaf nitrogen concentration level after the harvest is less than 2.63%, while low yields may occur when the leaf nitrogen concentration level after the harvest is greater than 2.63%. The relationship between tree nutritional condition and yields is not exactly the same when the leaf nitrogen concentration level is used as a predictor (FIG. 27B) rather than a descriptor (FIG. 27A) of plant yields.

III. Precision Fertilization

Using techniques disclosed herein, in any given growing season, fertilizers may be applied to individual plants or a group of plants in a yield category according to the optimum nutrient level for each nutrient element for the growing season as determined by the nutrient-yield models based on quantile regression analysis or artificial neural network analysis.

For example, as described above, the optimum nutrient concentration levels for each nutrient element for plants in different yield categories may be different. Thus, different fertilization strategies may be applied to different plants or different groups of plants having different potential yield in a same orchard for precision fertilization. A user of the disclosed techniques may fertilize a plant or a group of plants based on the optimum nutrient concentration level for each yield category for each nutrient element and the measured actual nutrient concentration level for each nutrient element in the plant tissue.

In some cases, a same plant or a same group of plants may need different fertilization strategies for different growing seasons for optimum fruit production. For example, the fertilization strategy for a plant in an "OFF" cycle may be different from the fertilization strategy for the same plant when it is in an "ON" cycle. Furthermore, the leaf concentration level for each nutrient element after the harvest or at the beginning of each growing season may be different. As described above, when an appropriate fertilization strategy is applied, the number or the fraction of plants in the "OFF" cycle may also be reduced, and thus the overall yield may be improved.

In some cases, a same plant or a same group of plants may be assigned to different yield categories in different growing seasons (e.g., based on historic data), and thus may need different fertilization strategies for different growing seasons for optimum fruit production. For example, a plant's yield may improve to be in a different yield category, resulting in a promotion of the plant to a higher yield category. The different yield category can result in different nutrients being applied to the plant due to a different relationship between the plant yield and nutrient concentration levels for the new yield category. Similarly, a plant can be demoted to a lower yield category due to the plant having a yield in a most recent growing season (or average over several growing seasons) that now falls under a lower yield category (e.g., quantile). This reassessment of yield category can occur periodically, e.g., between each growing season.

In some embodiments, the computer system may provide fertilization recommendations to the user, and the user may fertilize the plant or the group of plants based on the fertilization recommendations.

The precision fertilization techniques disclosed herein not only can improve the crop production, but also can reduce fertilizer cost, and thus can improve the overall profit for growing the crop. In addition, the precision fertilization techniques may avoid damages to the root of the plant due to the toxic effect of some nutrient elements, such as chloride. Furthermore, the precision fertilization techniques can improve environmental safety by reducing unnecessary fertilization and minimizing groundwater contamination from the unnecessary fertilization.

IV. Example Computer System

Figure 28:
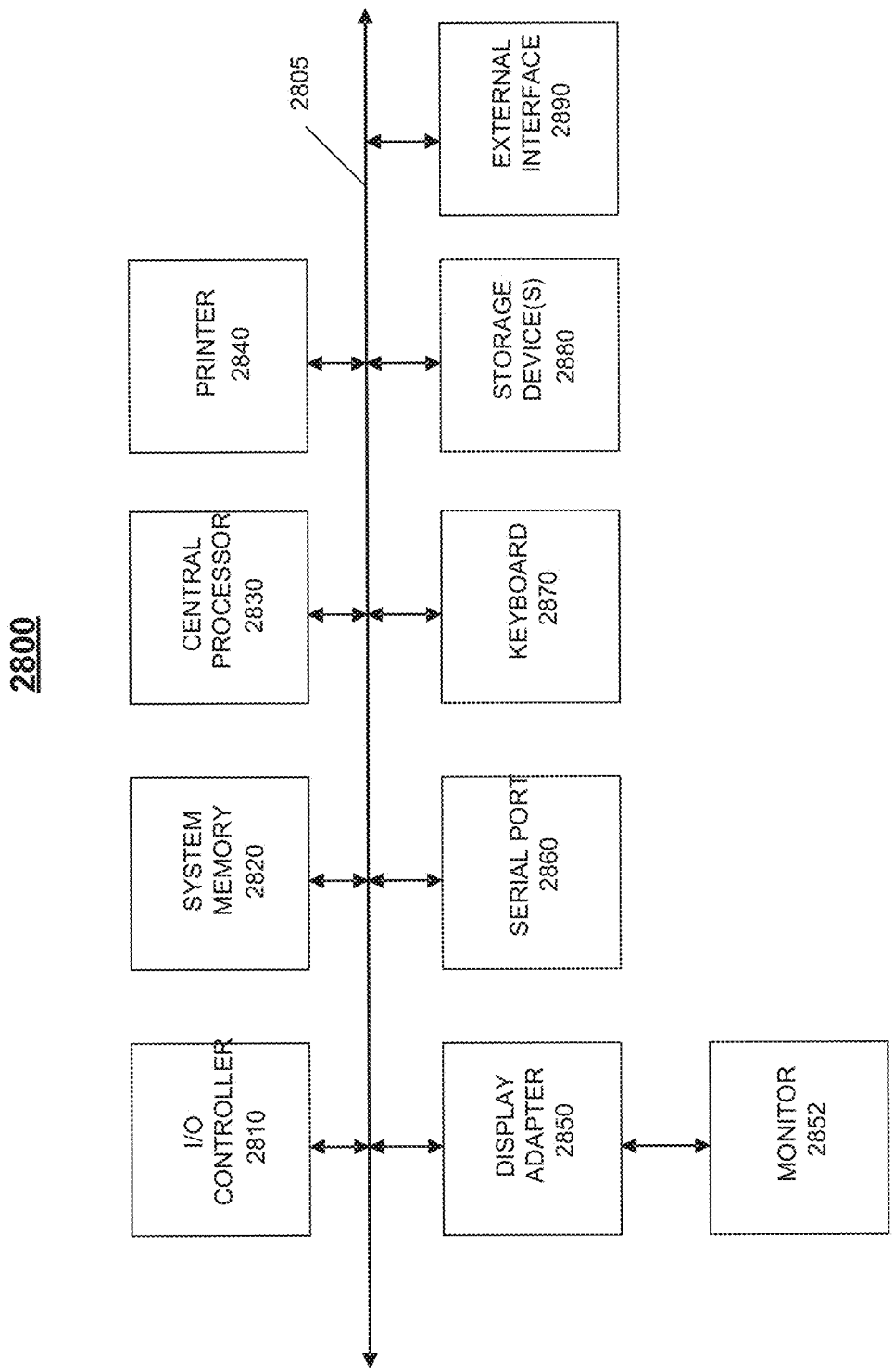
FIG. 28 illustrates an example computer system that may be utilized to implement techniques disclosed herein.

Any of the computer systems mentioned herein may utilize any suitable number of subsystems. Examples of such subsystems are shown in FIG. 28 in computer apparatus 2800. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 28 are interconnected via a system bus 2805. Additional subsystems such as a printer 2840, keyboard 2870, storage device(s) 2880, monitor 2852, which is coupled to display adapter 2850, and others are shown. Peripherals and input/output (I/O) devices, which couple to I/O controller 2810, can be connected to the computer system by any number of means known in the art, such as serial port 2860. For example, serial port 2860 or external interface 2890 (e.g. Ethernet, Wi-Fi, etc.) can be used to connect computer system 2800 to a wide area network such as the Internet, a mouse input device, or a scanner. The interconnection via system bus 2805 allows the central processor 2830 to communicate with each subsystem and to control the execution of instructions from system memory 2820 or the storage device(s) 2880 (e.g., a fixed disk), as well as the exchange of information between subsystems. The system memory 2820 and/or the storage device(s) 2880 may embody a computer readable medium. Any of the values mentioned herein can be output from one component to another component and can be output to the user.

A computer system can include a plurality of the same components or subsystems, e.g., connected together by external interface 2890 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

In this disclosure, various embodiments are described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiments being described.

What is claimed is:

1. A computer-implemented method for improving plant production comprising:
  receiving nutrient data and yield data for a plurality of plants, the nutrient data including concentration levels of one or more nutrient elements in plant tissues;
  categorizing the plurality of plants into a plurality of yield categories based on the yield data;
  for each yield category of the plurality of yield categories:
    analyzing the nutrient data and the yield data for plants in the yield category to determine a relationship between a plant yield and a nutrient concentration level for each nutrient element of the one or more nutrient elements; and
  for each yield category of the plurality of yield categories:
    applying fertilizers to the plants in the yield category, the applied fertilizers having a nutrient level for each nutrient element of the one or more nutrient elements, and the nutrient level determined using the determined relationship between the plant yield and the nutrient concentration level for each nutrient element of the one or more nutrient elements for improved yields.

2. The method of claim 1, wherein each yield category of the plurality of yield categories corresponds to a different quantile of yield for the plurality of plants.

3. The method of claim 1, further comprising:
  receiving a user input regarding a plant or a group of plants, the user input including an identification of a yield category or a yield value of the plant or the group of plants;
  determining a first nutrient level corresponding to improved yields for each nutrient element of the one or more nutrient elements for the plant or the group of plants based on the relationship between the plant yield and the nutrient concentration level for each nutrient element; and
  providing the first nutrient level for each nutrient element to the user.

4. The method of claim 3, further comprising:
  determining the yield category for the plant or the group of plants based on the user input; and
  selecting a first relationship between the plant yield and the nutrient concentration level for each nutrient element corresponding to the determined yield category for determining the first nutrient level.

5. The method of claim 4, wherein the yield category for the plant or the group of plants is different from a yield category of the plant or the group of plants in a previous growing season.

6. The method of claim 4, further comprising:
  selecting a second relationship between the plant yield and the nutrient concentration level for each nutrient element corresponding to a second yield category different from the determined yield category;
  determining a second nutrient level corresponding to improved yields for each nutrient element for the plant or the group of plants based on the second relationship; and
  determining a recommended nutrient level for each nutrient element based on the first nutrient level and the second nutrient level.

7. The method of claim 6, wherein determining the recommended nutrient level includes determining an overlapped range of the first nutrient level and the second nutrient level.

8. The method of claim 4, further comprising:
  determining a second nutrient level corresponding to a reduced number of nonproducing plants for each nutrient element; and
  determining a recommended nutrient level for each nutrient element based on the first nutrient level and the second nutrient level.

9. The method of claim 3,
  wherein the user input includes a plant tissue nutrient concentration level for a nutrient element for the plant or the group of plants; and
  the method further comprises determining a difference between the plant tissue nutrient concentration level for the nutrient element in the user input and the first nutrient level for the nutrient element.

10. The method of claim 9, further comprising:
  providing a fertilization strategy to the user based on the difference between the plant tissue nutrient concentration level for the nutrient element in the user input and the first nutrient level for the nutrient element.

11. The method of claim 1, wherein the one or more nutrient elements includes at least one of nitrogen (N), phosphorus (P), potassium (K), calcium (Ca), magnesium (Mg), Zinc (Zn), manganese (Mn), iron (Fe), copper (Cu), boron (B), sodium (Na), or chloride (Cl).

12. The method of claim 1, wherein analyzing the nutrient data and the yield data for plants in the yield category includes analyzing the nutrient data and the yield data using a quantile regression or an artificial neural network modeling technique.

13. The method of claim 1, further comprising:
  determining a relationship between the plant yield and multiple nutrient elements using Kohonen self-organizing maps (KSOMs).

14. A non-transitory computer-readable storage medium storing a plurality of instructions executable by one or more processors, the plurality of instructions that, when executed by the one or more processors, cause the one or more processors to:
  receive nutrient data and yield data for a plurality of plants, the nutrient data including concentration levels of one or more nutrient elements in plant tissues;
  categorize the plurality of plants into a plurality of yield categories based on the yield data;
  for each yield category of the plurality of yield categories:
    analyze the nutrient data and the yield data for plants in the yield category to determine a relationship between a plant yield and a nutrient concentration level for each nutrient element of the one or more nutrient elements; and
  for each yield category of the plurality of yield categories:
    applying fertilizers to the plants in the yield category, the applied fertilizers having a nutrient level for each nutrient element of the one or more nutrient elements, and the nutrient level determined using the determined relationship between the plant yield and the nutrient concentration level for each nutrient element of the one or more nutrient elements for improved yields.

15. The non-transitory computer-readable storage medium of claim 14, wherein the plurality of instructions, when executed by the one or more processors, further cause the one or more processors to:
  receive a user input regarding a plant or a group of plants, the user input including an identification of a yield category or a yield value of the plant or the group of plants;

determine a first nutrient level corresponding to improved yields for each nutrient element of the one or more nutrient elements for the plant or the group of plants based on the relationship between the plant yield and the nutrient concentration level for each nutrient element; and provide the first nutrient level for each nutrient element to the user.

16. The non-transitory computer-readable storage medium of claim 15, wherein the plurality of instructions, when executed by the one or more processors, further cause the one or more processors to:

determine the yield category for the plant or the group of plants based on the user input; and select a first relationship between the plant yield and the nutrient concentration level for each nutrient element corresponding to the determined yield category for determining the first nutrient level.

17. The non-transitory computer-readable storage medium of claim 16, wherein the plurality of instructions, when executed by the one or more processors, further cause the one or more processors to:

select a second relationship between the plant yield and the nutrient concentration level for each nutrient element corresponding to a second yield category different from the determined yield category;

determine a second nutrient level corresponding to improved yields for each nutrient element for the plant or the group of plants based on the second relationship; and determine a recommended nutrient level for each nutrient element based on the first nutrient level and the second nutrient level.

18. The non-transitory computer-readable storage medium of claim 16, wherein the plurality of instructions, when executed by the one or more processors, further cause the one or more processors to:

determine a second nutrient level corresponding to a reduced number of nonproducing plants for each nutrient element; and determine a recommended nutrient level for each nutrient element based on the first nutrient level and the second nutrient level.

19. A system comprising:

one or more processors; and a non-transitory computer-readable medium including instructions that, when executed by the one or more processors, cause the one or more processors to perform operations including:

receiving nutrient data and yield data for a plurality of plants, the nutrient data including concentration levels of one or more nutrient elements in plant tissues;

categorizing the plurality of plants into a plurality of yield categories based on the yield data;

for each yield category of the plurality of yield categories:

analyzing the nutrient data and the yield data for plants in the yield category to determine a relationship between a plant yield and a nutrient concentration level for each nutrient element of the one or more nutrient elements; and for each yield category of the plurality of yield categories:

applying fertilizers to the plants in the yield category, the applied fertilizers having a nutrient level for each nutrient element of the one or more nutrient elements, and the nutrient level determined using the determined relationship between the plant yield and the nutrient concentration level for each nutrient element of the one or more nutrient elements for improved yields.

* * * * *